United States Patent
Kawasaki

(10) Patent No.: US 8,156,446 B2
(45) Date of Patent: Apr. 10, 2012

(54) INFORMATION PROCESSING DEVICE, AND CONTROL METHOD

(75) Inventor: Shinya Kawasaki, Sagamihara (JP)

(73) Assignee: Olympus Corporation, Tokyo (JP)

( * ) Notice: Subject to any disclaimer, the term of this patent is extended or adjusted under 35 U.S.C. 154(b) by 1134 days.

(21) Appl. No.: 11/940,450

(22) Filed: Nov. 15, 2007

(65) Prior Publication Data

US 2008/0168394 A1 Jul. 10, 2008

(30) Foreign Application Priority Data

Nov. 17, 2006 (JP) .................................. 2006-312081

(51) Int. Cl.
*G06F 3/048* (2006.01)
(52) U.S. Cl. ........ 715/811; 715/810; 715/764; 715/700; 348/211.2; 348/211.1; 348/211.99; 348/207.99
(58) Field of Classification Search .................. 715/811; 348/333
See application file for complete search history.

(56) References Cited

U.S. PATENT DOCUMENTS

| | | | |
|---|---|---|---|
| 5,577,189 A * | 11/1996 | Gay et al. ...................... | 715/800 |
| 5,736,974 A * | 4/1998 | Selker ........................... | 715/862 |
| 2004/0145660 A1* | 7/2004 | Kusaka ....................... | 348/211.2 |
| 2007/0211160 A1* | 9/2007 | Katayama et al. ....... | 348/333.05 |

FOREIGN PATENT DOCUMENTS

| | | |
|---|---|---|
| JP | 11-259459 A | 9/1999 |
| JP | 2002-2157059 A | 5/2002 |
| JP | 2005242530 A | 9/2005 |
| JP | 2005527056 A | 9/2005 |
| JP | 2006-042318 A | 2/2006 |

OTHER PUBLICATIONS

Japanese Office Action dated Jan. 10, 2012, issued in corresponding Japanese Patent Application No. 2006-312081.

* cited by examiner

*Primary Examiner* — Tadeese Hailu
*Assistant Examiner* — Darrin Hope
(74) *Attorney, Agent, or Firm* — Westerman, Hattori, Daniels & Adrian, LLP

(57) ABSTRACT

A digital camera as an information processing device comprises a storage unit which stores a taken still image and which includes a history information storage section to store history information associated with the still image, a CPU which includes a history information processing unit to perform processing regarding the history information and which controls the processing in each unit of the digital camera, a communication unit which communicates with other digital cameras in a wired or wireless manner, and a display unit which displays the still image and the history information.

21 Claims, 15 Drawing Sheets

```
< history >
    < histID id = 0001 >
        < sender >
            < devicename > dev001< / devicename >
            < senddate > 2005 / 11 / 26 < / senddate >
            < sendtime > 18 : 30 : 21< / sendtime >
            < sendlocate >
                < GPSLatitudeRef >N< / GPSLatitudeRef >
                < GPSLatitude > 35 / 1,41 / 1,774 / 100 < / GPSLatitude >
                < GPSLongitudeRef > E < / GPSLongitudeRef >
                < GPSLongitude >139 / 1,48 / 1,774 / 100 < / GPSLongitude >
            < / sendlocate >
            < metod >< / method >← Write " move " in tag in case of move
        < / sender >
        < receiver >
            < devicename > dev002 < / devicename >
            < recvdate > 2005 / 11 / 26 < / recvdate >
            < recvtime >18 : 30 : 25 < / recvtime >
            < recvlocate >
                < GPSLatitudeRef > N < / GPSLatitudeRef >
                < GPSLatitude > 36 / 1,49 / 1,770 / 100 < / GPSLatitude >
                < GPSLongitudeRef > E < / GPSLongitudeRef >
                < GPSLongitude >139 / 1,42 / 1,128 / 100 < GPSLongitude >
            < / recvlocate >
            < method > copy < / method >← Write " copy " in tag in case of saving
        < /receiver >
    < / histID >
    < histID id = 0002 >
        < sender >
            < devicename > dev002 < / devicename >
            < senddate > 2005 / 11 / 29 < / senddate >
            < sendtime > 9 : 15 : 56 < / sendtime >
            < sendocate >
                < GPSLatitudeRef > N < / GPSLatitudeRef >
                < GPSLatitude > 36 / 1,49 / 1,770 / 100 < / GPSLatitude >
                < GPSLongitudeRef > E < / GPSLongitudeRef >
                < GPSLongitude >139 / 1,42 / 1,128 / 100 < / GPSLongitude >
            < / sendlocate >
            < metod >< / method >
        < / sender >
        < receiver >
            < devicename > dev003 < / devicename >
            < recvdate > 2005 / 11 / 29 < / recvdate >
            < recvtime > 9 : 15 : 56 < / recvtime >
            < recvlocate >
                < GPSLatitudeRef > N < / GPSLatitudeRef >
                < GPSLatitude > 35 / 1,19 / 1,680 / 100 < / GPSLatitude >
                < GPSLongitudeRef > E < / GPSLongitudeRef >
                < GPSLongitude >133 / 1,52 / 1,115 / 100 < / GPSLongitude >
            < / recvlocate >
            < method > copy < / method >
        < / receiver >
    < / histID >
< / history >
```

FIG. 3

```
< admin >
  < content id = 0001 >
    < history > ../ hst_0001. xml < history >
      < url > ROOT / DCIM/img_0001. JPG < / url >
  < / content >
  < content id = 0002 >
    < history > ../ hst_0002. xml < history >
      < url > ROOT / DCIM / IMAGE / img_0002. JPG < / url >
  < / content >
  < content id = 0003 >
    < history > ../ hst_0003. xml < history >
      < url > ROOT / DCIM / IMAGE / img_0003. JPG < / url >
< / admin >
```

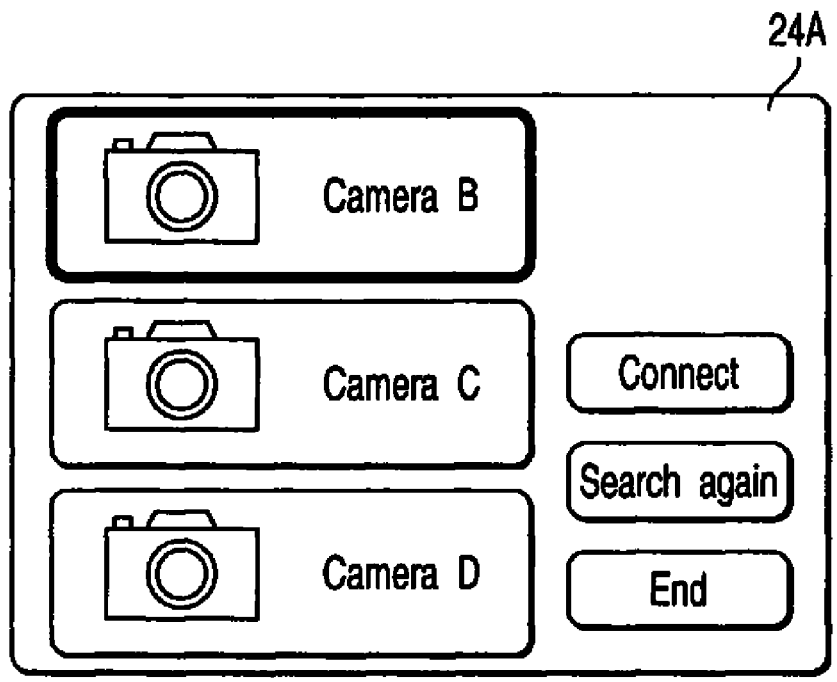
F I G. 6 A
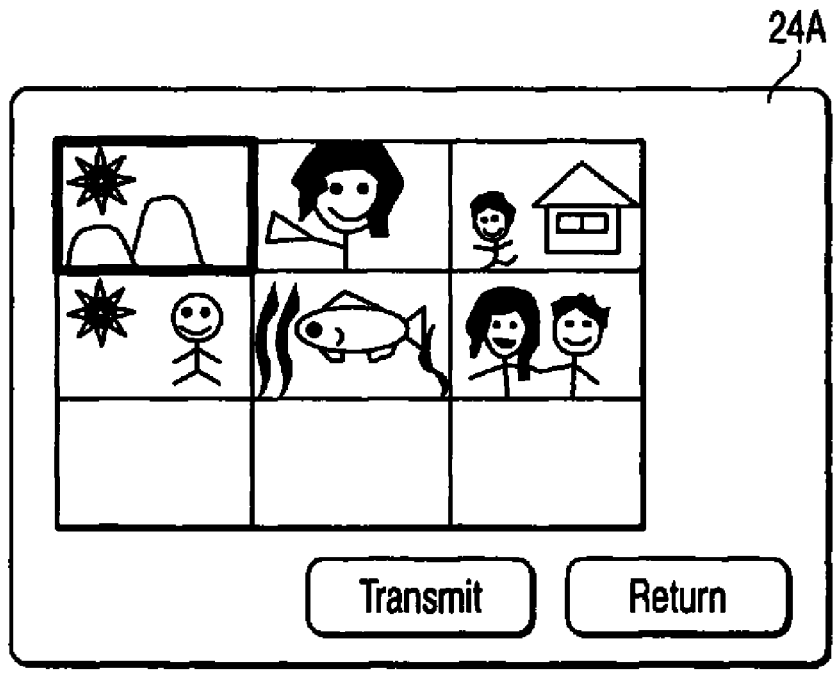
F I G. 6 B

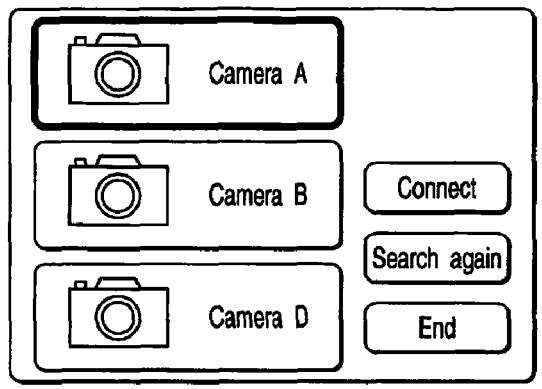
FIG. 8A
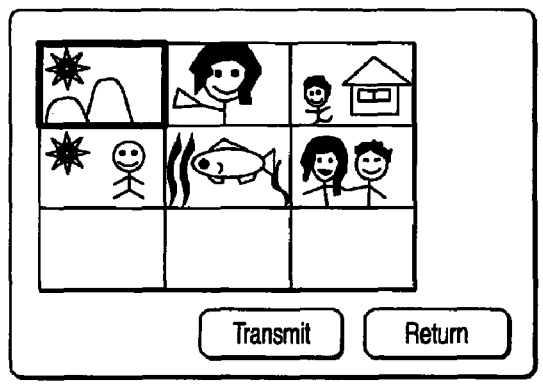
FIG. 8B
```
< / histID id = 0003 >
  < notify >
    < devicename > dev001 < / devicename >
    < date> 2005 / 12 / 22 < / date >
    < time> 16 : 03 : 30 < / time >
    < method > delete < / method >←In case of deletion.Write "modify" in case of modification
  < / notify >
< / histID >
```
FIG. 9

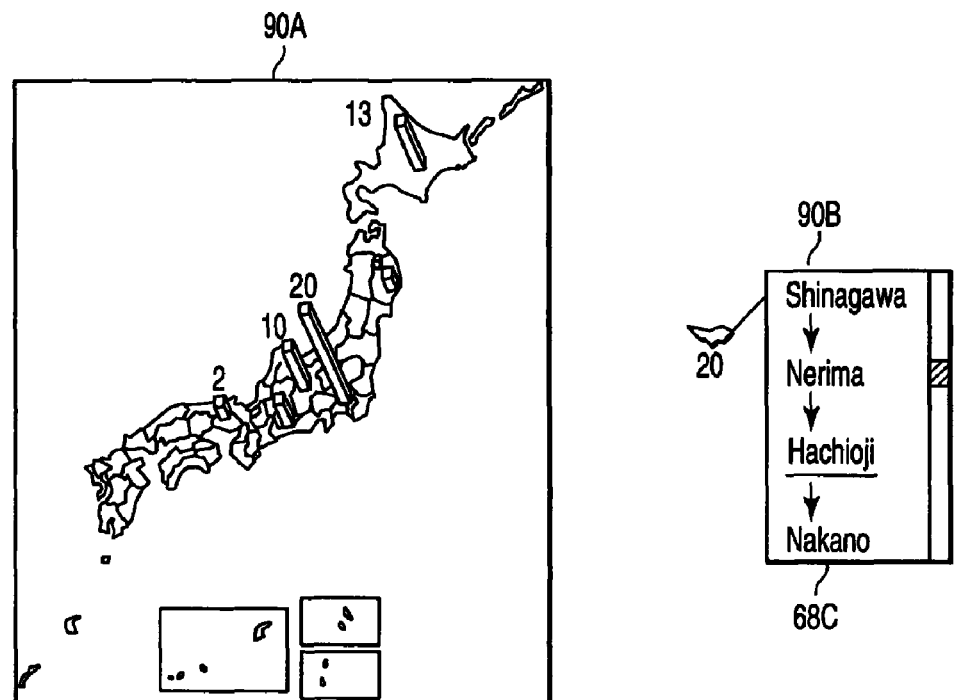
FIG. 20A
FIG. 20B
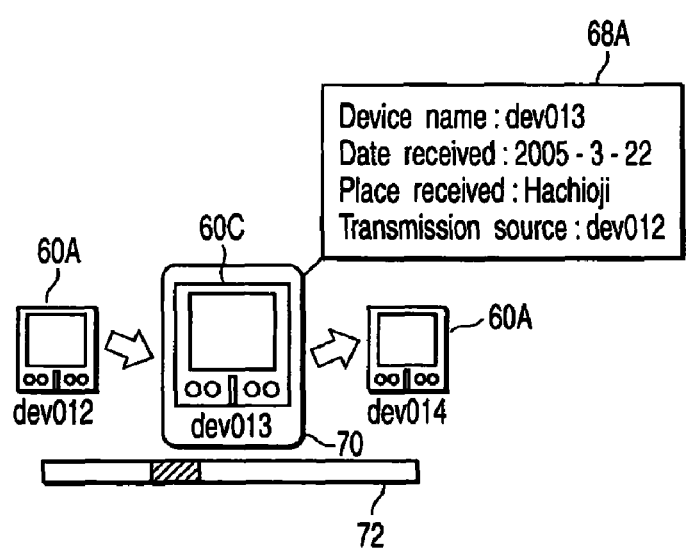
FIG. 20C

INFORMATION PROCESSING DEVICE, AND CONTROL METHOD

CROSS-REFERENCE TO RELATED APPLICATIONS

This application is based upon and claims the benefit of priority from prior Japanese Patent Application No. 2006-312081, filed Nov. 17, 2006, the entire contents of which are incorporated herein by reference.

BACKGROUND OF THE INVENTION

1. Field of the Invention

The present invention relates to an information processing device, and a control method.

2. Description of the Related Art

Recently, various kinds of content have been increasingly shared with various devices owing to the advance of network technology. For example, image data taken by a digital camera can be transferred to, for example, a personal computer, a mobile telephone, a DVD recorder or a television.

As content can be shared with so many devices, it is becoming more difficult for a user of the device having content to know which device the content present in a certain device has been transferred from or which device the content has been transferred to.

For example, Jpn. Pat. Appln. KOKAI Publication No. 2005-242530 has proposed a system of handling history information on the exchange of content among a plurality of devices, Moreover, Jpn. Pat. Appln. KOKAI Publication No. 2005-527056 has proposed sharing the history of user's reviews of content on a peer-to-peer network so that user evaluation of the content can be shared among users.

BRIEF SUMMARY OF THE INVENTION

An information processing device according to a first aspect of the present invention comprises:

a content storage unit which stores content;

a history information processing unit which acquires history information associated with the content, analyzes the history information, and outputs history display information on the basis of the result of the analysis of the history information; and a display unit which displays the history information for the content on the basis of the history display information.

A control method according to a second aspect of the present invention comprises:

causing a computer to acquire history information associated with content stored in a storage unit of the computer, analyze the history information, and output history display information on the basis of the result of the analysis of the history information; and causing the computer to display the history information for the content on the basis of the history display information.

BRIEF DESCRIPTION OF THE SEVERAL VIEWS OF THE DRAWING

FIG. 3 is a diagram showing an example of the description of history information;

FIG. 6A is a diagram showing a display example of a screen for selecting a receiving end digital camera in the case of the push store;

FIG. 6B is a diagram showing a display example of a screen for selecting an image for the push store;

FIG. 8A is a diagram showing a display example of a screen for selecting a transmitting end digital camera in the case of the pull store;

FIG. 8B is a diagram showing a display example of a screen for selecting an image for the pull store;

FIG. 9 is a diagram showing an example of a description added to the history information when a still image is deleted or modified in the digital camera;

FIG. 178 is a diagram showing a display example in which a cursor is adjusted to a dashed arrow icon;

FIG. 20A is a diagram showing an example of the display of the history information using the association of the history information with position information;

FIG. 20B is a diagram showing an example of the display of the history information using the association of the history information with the position information;

FIG. 20C is a diagram showing an example of the display of the history information using the association of the history information with the position information.

DETAILED DESCRIPTION OF THE INVENTION

Hereinafter, a best mode for carrying out the present invention will be explained with reference to the drawings.

Figure 1:
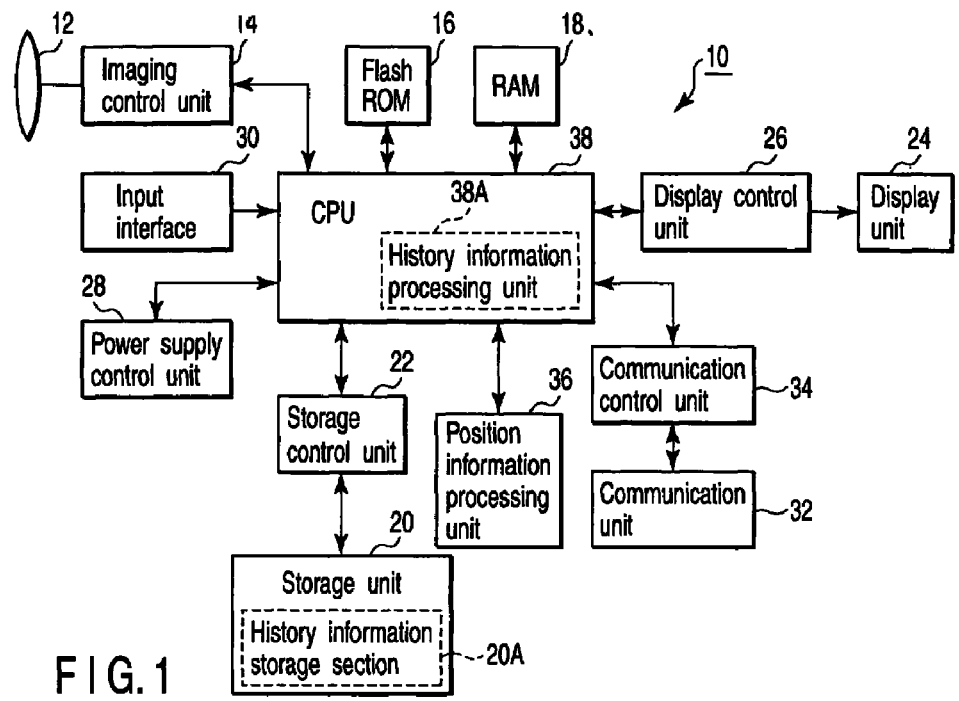
FIG. 1 is a schematic block configuration diagram of a digital camera as an information processing device according to one embodiment of the present invention.

FIG. 1 is a block diagram schematically showing a digital camera 10 as an information processing device according to an embodiment of the present invention. In the present embodiment, both an information processing device transmitting content and an information processing device receiving content are the digital cameras 10. Moreover, the content transmitted to and received from the devices consists of still images. It will however be apparent that the information processing device of the present invention is not limited to a digital camera. It will also be apparent that the content transmitted and received by the information processing devices is not limited to still images.

The digital camera 10 has an imaging unit 12, an imaging control unit 14, a flash ROM 16, a RAM 18, a storage unit 20, a storage control unit 22, a display unit 24, a display control unit 26, a power supply control unit 28, an input interface 30, a communication unit 32, a communication control unit 34, a position information processing unit 36 and a CPU 38.

Furthermore, the CPU 38 comprises a history information processing unit 38A, and the storage unit 20 comprises a history information storage section 20A. However, the history information storage section 20A may be configured to be independent from the storage unit 20.

The imaging unit 12 takes an image, and the imaging control unit 14 controls this imaging unit 12. The flash ROM 16 stores a program for performing various kinds of control of the digital camera 10 to be executed by the CPU 38. The RAM 18 is a work memory which secures a necessary amount of a work area and temporarily stores data to be processed during the execution of the program. The storage unit 20 stores still images. A detachable storage medium (such as a memory card or a magneto-optical disk) is also applicable as the storage unit 20. Further, the history information storage section 20A for storing history information stores history information for content (still images) explained later. The storage control unit 22 controls reading of data from the storage unit 20 and writing of data into the storage unit 20.

The display unit 24 displays images, character information, etc. The display unit 24 is, for example, a liquid crystal display (hereinafter, LCD). The display control unit 26 controls the operation of the display unit 24 and also acquires a display region (available display size) of the display unit 24. The power supply control unit 28 controls a power supply of the digital camera 10. The input interface 30 includes a release button and various operation switches for giving instructions to the digital camera 10. The communication unit 32 is an interface for wired and/or wireless communication. The communication control unit 34 controls the communication of the communication unit 32 with an external device. The position information processing unit 36 acquires the latitude, longitude and altitude at which the digital camera 10 is located.

The CPU 38 controls the above-mentioned control units and processing units to perform various computations. The history information processing unit 38A provided in the CPU 38 processes the history information for content.

Figure 2:
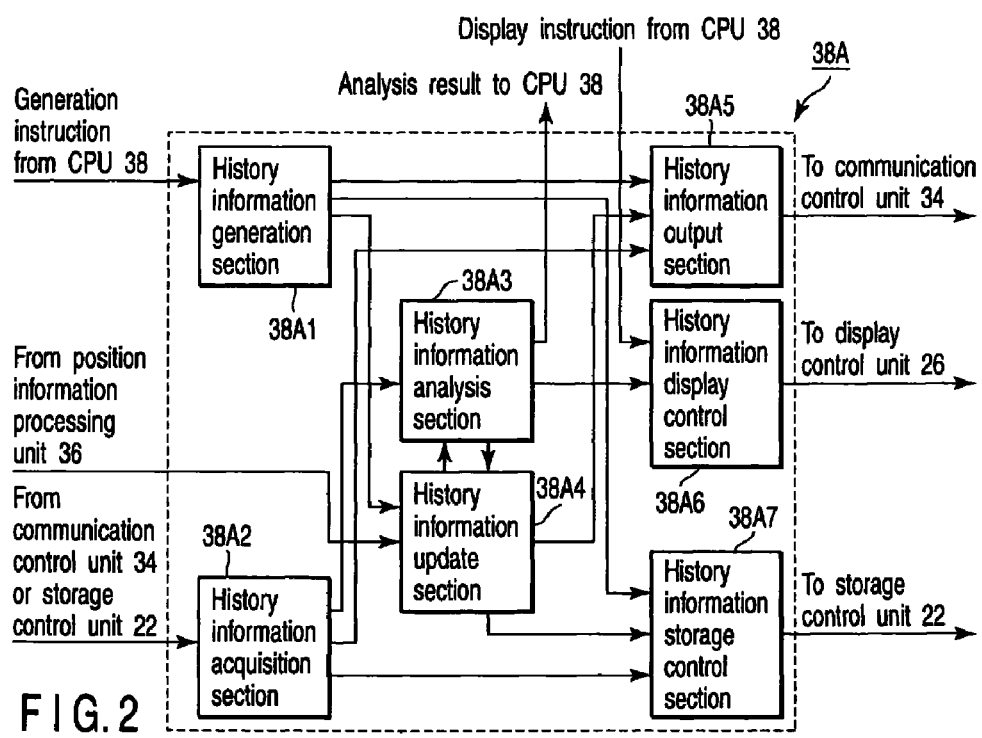
FIG. 2 is a function block diagram of a history information processing unit of the digital camera in FIG. 1.

FIG. 2 is a function block diagram of the history information processing unit 38A.

The history information processing unit 38A has a history information generation section 38A1, a history information acquisition section 38A2, a history information analysis section 38A3, a history information update section 38A4, a history information output section 38A5, a history information display control section 38A6 and a history information storage control section 38A7.

The history information generation section 38A1 generates, in the RAM 18, metadata serving as a basis for history information and described in, for example, Extended Markup Language (XML), in accordance with a history information generation instruction from the CPU 38, in the case where a still image has no history information when transmitted by the digital camera 10. Then, the history information generation section 38A1 acquires, from the CPU 38, a device name corresponding to the name of the digital camera 10, an IP address, a serial number, a model name, a current time, etc., and sends them to the history information update section 38A4 together with the generated history information.

The history information update section 38A4 acquires the device name, the current time, a history ID explained later, a position information, etc., and adds them to the history information.

The history information acquisition section 38A2 reads the existing history information from the history information storage section 20A of the digital camera 10, and expands the history information on the RAM 18 of the digital camera 10 to update, transmit or analyze the history information. Further, the history information acquisition section 38A2 passes the history information received from an external digital camera via the communication unit 32 of the digital camera 10 to the history information analysis section 38A3. The history information acquisition section 38A2 can also pass the received history information to the history information storage control section 38A7 in order to store the history information in the history information storage section 20A of the digital camera 10 as it is.

The history information storage control section 38A7 records the history information in the history information storage section 20A of the digital camera 10 via the storage control unit 22. The history information output section 38A5 sends the history information to another digital camera outside the digital camera 10 via the communication control unit 34 of the digital camera 10. The history information analysis section 38A3 reads the history information from the history information update section 38A4 and the history information acquisition section 38A2. Then, the history information analysis section 38A3 judges whether the history information has been correctly described, and extracts various parameters such as the device name and data and time. The history information display control section 38A6 specifies, for the display control unit 26, an item to be displayed on the display unit 24, the sizes of, for example, an image and character information to be displayed, etc., in accordance with the result of the analysis of the history information and an instruction on a display method from the CPU 38.

FIG. 3 shows an example of the description of the history information explained above. The history information shown in FIG. 3 is described in XML. The history information is not exclusively described in XML, and may also be described in other languages or in a data format. In the present embodiment, the digital camera 10 is assumed as the information processing device. However, as described later, the embodiment of the present invention is not limited to the digital camera 10 and may be applied to other devices. It is therefore desirable that the history information be described in a language or a data format compatible with various devices.

The construction of the history information shown in FIG. 3 is briefly explained. Details will be explained after the following explanation of the processing of transmitting and receiving still images to and from the digital cameras 10.

In the present embodiment, the history information is created for each still image stored in the storage unit 20 of the digital camera 10. This is preferable from the viewpoint of the administration of the history information explained below. When the history information for a plurality of still images is to be administered by one history information file, the history information for deleted still images remains in the past history information, so that rewriting of the description of the history information file may be troublesome if the history information for the deleted still images is unnecessary. Moreover, of operations other than the operation for a still image as explained later, additional writing into the history information can be avoided for operations that do not have to be shared with other users as history information (e.g., when a still image has not been modified in a certain digital camera and has only been moved by changing a directory in the storage unit). This makes it possible to prevent the accumulation of unnecessary history information.

It should be understood that the history information in FIG. 3 is thus the history information for a particular still image stored in the storage unit 20.

The history information starts with <history> and ends with </history>. Between these two descriptions, there are, in a nested form, a description starting with <histID id=0001> and ending with </histID> and a description starting with <histID id=0002> and ending with </histID>. These descriptions starting with <histID . . . > and ending with </histID> are added every processing of the digital camera 10 (e.g., transmission and reception of a still image to and from other digital cameras 10 explained later, a modification of a still image in a certain digital camera 10, deletion of a still image in a certain digital camera 10, etc.). The numerical value of an id element increases every time the processing is performed. Thus, a smaller value of the id element signifies older history information. Moreover, these id elements do not overlap in the history information and have uniqueness. In the example shown in FIG. 3, between the descriptions starting with <histID . . . > and ending with </histID>, there are described information on the digital camera which has transmitted a still image and a transmission method thereof, and information on the digital camera 10 which has received the still image and a receiving method thereof. These descriptions are explained again in the following explanation of the transmission and reception of the still image to and from the digital cameras 10.

As explained above, since the history information shown in FIG. 3 is the history information for a particular still image, this history information has no description of which still image this history information concerns (It is possible to express a still image by a file name and write the file name in the history information. However, as mentioned above and as explained below, it is not preferable from the viewpoint of the use of the history information to specify the structure of a directory storing this still image and write the file name of this still image. On the other hand, writing the file name alone without distinguishing the directory storing the still image leads to a disadvantage of being unable to distinguish from a different still image with the same file name stored in a different directory. For such reasons, it is preferable to write, in the history information, no information for specifying a corresponding still image.) Therefore, there is a need for information (hereinafter referred to as administration information) to associate the history information with a still image whose history is described in this history information. This administration information is explained below.

Figures 4A, 4B:
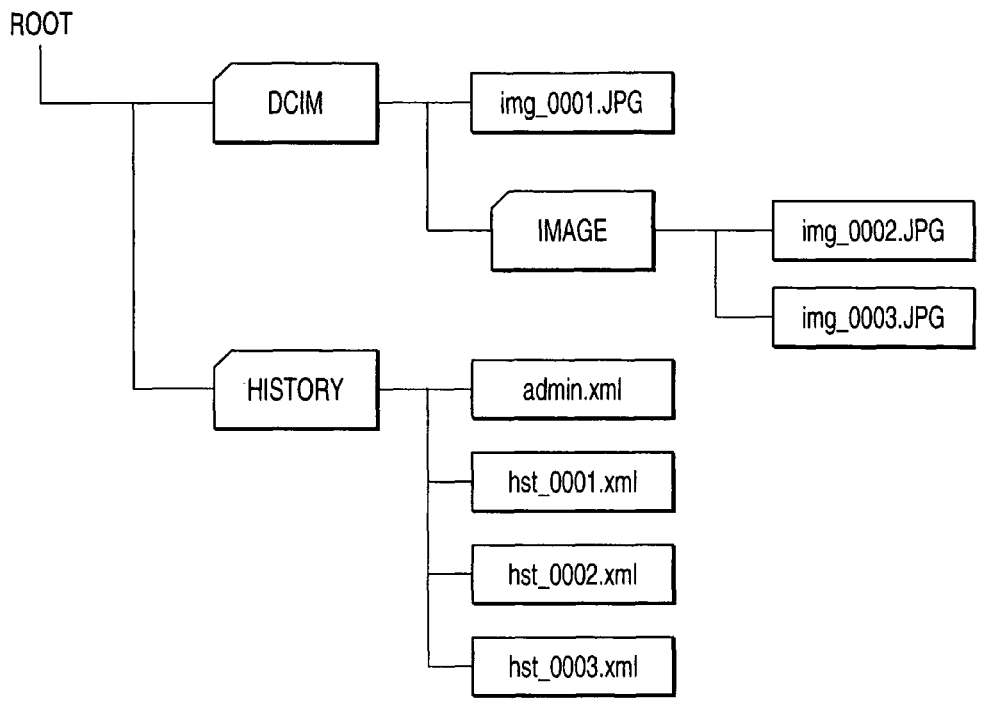
FIG. 4A is a diagram showing an example of a tree structure of directories within a storage unit of the digital camera.
FIG. 4B is a diagram showing an example of the description of administration information corresponding to the tree structure of the directories shown in FIG. 4A.

FIG. 4A shows a tree structure of directories within the storage unit 20 of the digital camera 10 according to the present embodiment. FIG. 4B shows an example of the administration information corresponding to the tree structure in FIG. 4A.

In the tree structure of the directories shown in FIG. 4A, files (img__0001.JPG, img__0002.JPG, img__0003.JPG) of still images are stored under a DCIM directory. Further, administration information (admin.xml) explained below and XML files of the history information explained above are stored under a HISTORY directory. In the directory tree shown in FIG. 4A, the files under the folder HISTORY correspond to the history information storage section 20A. However, this directory structure is one example, and other directory structures may be employed; for example, the files of the still images and the XML files of the administration information and the history information are stored in the same directory.

As shown in FIG. 4B, the administration information is also described in XML. However, in the same manner as the history information, the administration information may be described in a language other than XML or in a data format. The administration information in the present embodiment starts with <admin>, and ends with </admin>. In between, the positions of the files of the still images and the files of the administration information for the files of the still images in the directory tree within the storage unit 20 are described in a section starting with <content id= . . . > and ending with </content>. For example, between <content id=0001> and </content>, the position of the file img__0001.JPG of the still image in the directory tree within the storage unit 20 is described in a line starting with <url> and ending with </url>, and the position of a file hst__0001.xml of the history information corresponding to the still image in the directory tree within the storage unit 20 is described in a line starting with <history> and ending with </history>. Thus, the position of the file of the still image and the corresponding history information are described in the section starting with <content id= . . . > and ending with </content>. As a result, the still image is associated with the file of the corresponding history information. id of a content element may be provided in any manner as long as it maintains uniqueness. For example, they may be automatically provided so that the number increases when the digital camera 10 takes a still image or when a still image is acquired by communication with another digital camera. However, information on, for example, the time of the acquisition of the still image is reflected in the history information as explained above. Therefore, id of the content element is independent of, for example, the time of the acquisition of the still image. A user may operate via the input interface 30 to exchange ids of the content elements without changing a pair of information written between the content elements on the still image and the position of the file of the history information in the directory. Moreover, as explained below, when both the still image and the file of the history information of this still image are deleted from the digital camera 10, it is possible to perform automatic control so that the digital camera 10 shifts the ids of the content elements larger than a free id one by one and fills the free space in order to compensate for the free id. In addition, the free id may be used when a still image is newly associated with the corresponding history information.

On the other hand, information that does not have to be shared with the users of other digital cameras is not at all reflected in the history information as explained above. Instead, the description of the administration information is overwritten and thus rewritten. For example, when img_0001.JPG shown in FIG. 4A is moved under the IMAGE directory without modifying the still image, the history information is not changed. Instead, a url element written between <content id=0001> and </content> of the administration information is rewritten to "<url>ROOT/DCIM/IMAGE/img_0001.JPG</url>".

Thus, the history information and the administration information play complementary roles.

Embodiments of the transmission and reception of the still image and the administration information to and from the digital cameras 10 are explained below.

[First Embodiment of Transmission and Reception (Push Store and Pull Store)]

First explained below with reference to the drawings is an aspect where files of a still image and its history information are transmitted and received one to one by wireless between a digital camera 10 and another digital camera 10. As apparent from the following explanation, administration information is not moved from the digital cameras 10 in this transmission/reception.

Figure 5:
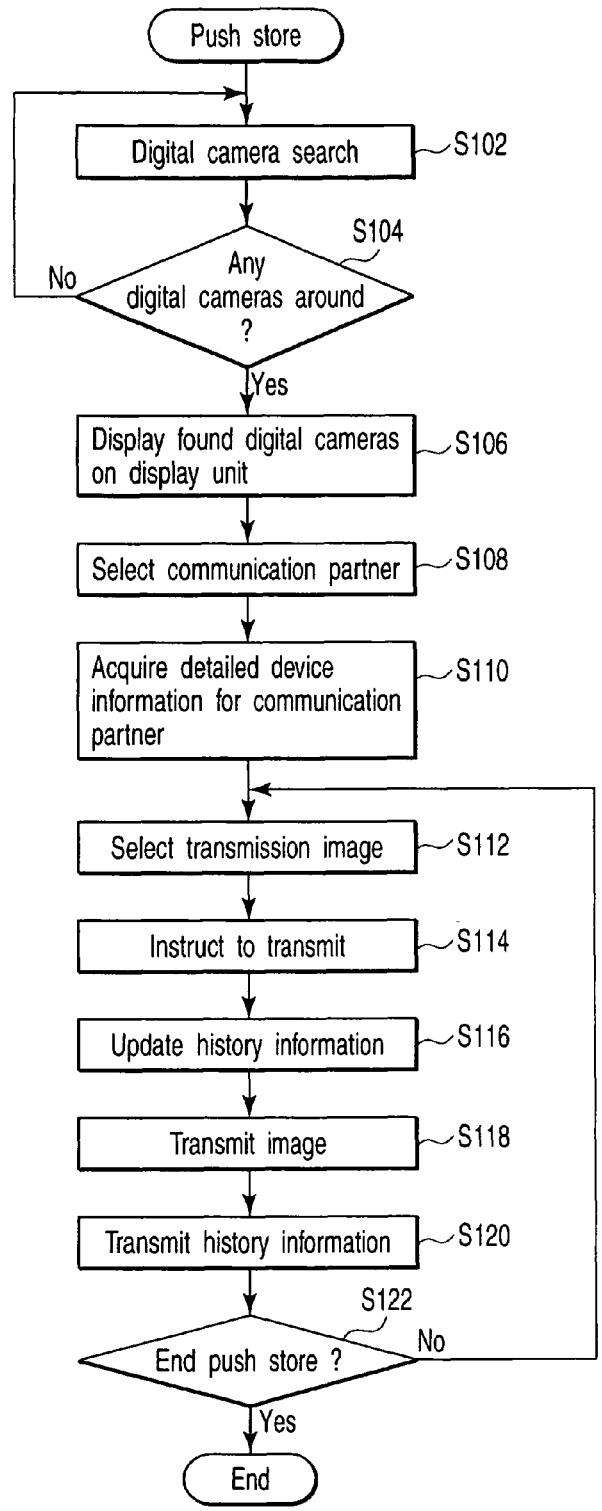
FIG. 5 is a flowchart of the processing of the digital camera when a still image is transmitted by push store.

FIG. 5 is a flowchart showing a flow of processing (push store) in which one digital camera 10 transmits files of a desired still image and the history information of this still image to the digital camera 10 which is the partner in the transmission/reception, in the case where the two digital cameras 10 perform transmission/reception one to one by wireless. Hereinafter, the digital camera 10 owned by a user at a transmitting end is referred to as digital camera A.

After the start of the flow, the user first selects a mode for causing digital camera A to search for a communication partner (step S102). As an example of a searching method, the present embodiment uses device discovery defined in universal plug and play (UPnP) which is a general standard technique. As a result of using the device discovery, peripheral digital cameras 10 available for communication response to digital camera A. When there is no response (step S104 branches to NO), the device discovery is continued until a response is made. When the peripheral digital cameras 10 available for communication response to digital camera A (step S104 branches to YES), digital camera A displays a screen for selecting a digital camera as the communication partner (step S106), and urges the user of digital camera A to select a digital camera as the communication partner. In this case, digital camera A displays the screen for selecting a digital camera as the communication partner on the basis of the type and name of the digital camera 10 contained in the response.

FIG. 6A shows a display example of such a screen for selecting a digital camera. Candidates (a camera B, a camera C and a camera D) for the communication partner are displayed in a display region 24A of the display unit 24 of digital camera A, and selectable by the user.

For explanation, it is assumed below that the camera B (hereinafter referred to as digital camera B) is selected (step S108). Then, digital camera A acquires more detailed information from this digital camera B (step S110). The detailed device information includes available services of the device, information on the position where digital camera B is presently located, etc. Then, the user of digital camera A selects a still image to be transmitted out of the still images saved in digital camera A (step S112).

FIG. 6B shows how the still images recorded in digital camera A are displayed as thumbnail images in the display region 24A of the display unit 24 of this digital camera A and selectable by the user of digital camera A. The user selects an image to be transmitted via the input interface 30 of digital camera A, and adjusts a cursor on a transmission button, and then gives an instruction to transmit this image through the input interface 30 (step S114). Digital camera A which has been given the transmission instruction refers to the administration information explained above to specify history information corresponding to the still image for which the transmission instruction has been issued, and updates the history information by adding transmission information for digital camera A itself to the file of the history information (step S116). The updated history information may be further stored in the history information storage section 20A in step S116. Specifically, a part starting with <sender> and ending with </sender> is added to the history information. Examples of items written in this part includes, the name (corresponding to <devicename> in FIG. 3) of digital camera A which is to transmit the still image, transmission date and time (corresponding to <senddate> and <sendtime> in FIG. 3, respectively), a place where the transmission is carried out (corresponding to <sendlocate> in FIG. 3), a transmission method (corresponding to <method> in FIG. 3), etc. The transmission place can be acquired from the position information processing unit 36 of digital camera A which transmits the still image. Alternatively, it is possible to communicate with, for example, a mobile telephone by way of the communication unit 32 and acquire position information which has been acquired by the mobile telephone from a base station, or to acquire position information in accordance with a global positioning system (GPS) device incorporated in the mobile telephone. Moreover, as the above-mentioned transmission method, the present embodiment can select a case where a still image remains in the storage unit 20 of digital camera A after the transmission of this still image (referred to as a "transfer") or a case where a still image is deleted from and does not remain in the storage unit 20 of digital camera A after the transmission of this still image (referred to as a "move"). In the present embodiment, move is written in the history information in a section starting with <method> and ending with </method> in the case of the move. This makes it possible to know from the history information whether digital camera A at the transmitting end has the still image which has been transmitted. Conversely, when the still image is transferred, nothing is written in the section starting with <method> and ending with </method>.

Then, digital camera A transmits the still image to digital camera B using a command such as an HTTP POST command common among the devices (step S118). Subsequently, the history information updated in step S116 before the transmission is transmitted to digital camera B (step S120). Then, when the user of digital camera A desires to further transmit a desired image from digital camera A to digital camera B by the push store processing explained above (step S122 branches to NO), the flow returns to step S112, and the user again starts to select an image to be transmitted. When the user of digital camera A desires to end the push store processing, the processing is terminated and flow is ended (step S122 branches to YES).

There is also a possibility that digital camera A acquires in advance device information on digital camera B as well as the information on the transmission and the history of the reception of this information is added to the history information and transmitted to digital camera B.

Next will be explained the processing of digital camera 8 to which the still image and the history information have been transmitted by the push store processing of digital camera A.

Digital camera B temporarily saves the still image in the RAM 18 and the history information in the history information storage section 20A. In the case of a still image which has been received for the first time, history information is newly created in digital camera B. At this point, digital camera B adds the device information on digital camera B itself to the stored history information. Specifically, digital camera B passes the received history information to the history information analysis section 38A3 of digital camera 8, and extracts the values of tags in the history information. Then, a largest <histID> tag is retrieved, and a <receiver> tag is created by the history information update section 38A4 after the </sender> tag described by digital camera A. The history information added by digital camera B is a description from <receiver> to </receiver>. Items that are added are about the same as the description from <sender> to </sender> added by digital camera A. In the present embodiment, the items that are added are the name of digital camera B, reception date and time, a reception place and a reception method. These items except for the reception method are not explained because corresponding tags and a method of obtaining described items are similar to those in the above-mentioned case of digital camera A. For the reception method, there are a case where the still image received and temporarily stored in the RAM 18 is stored in the storage unit 20 (referred to as a "copy") and a case where the still image temporarily stored in the RAM 18 is not stored in the storage unit 20 and deleted (referred to as an "access"). In the case of a copy, a copy is written in the section starting with <method> and ending with </method> which is created by digital camera B. As a result, it is apparent from the history information that the still image received by digital camera B is stored in the storage unit 20. On the other hand, in the case of an access, nothing is written in this section. In this case, the history information may be deleted because the still image is not present in digital camera B.

There is also a possibility that digital camera B transmits the updated latest history information to digital camera A and shares the history information with digital camera A.

Hereinafter, how the administration information of the digital cameras A and B are handled in the push store processing will be mentioned.

First, when the transmission of the still image by digital camera A is a transfer, the file of the still image remains in digital camera A, and there is thus no need to change the administration information. On the other hand, when the transmission of the still image by digital camera A is a move, the file of the still image does not remain in digital camera A, so that two aspects are possible with regard to the handling of the content in the <content> tag of the transmitted still image within the administration information.

In the first aspect, when the file of the still image is no longer present, the file of the corresponding history information is also deleted at the same time, and the corresponding <content> tag describing the positions of the still image and the history information in the storage unit 20 of digital camera A are deleted from the administration information. This aspect can be carried out when the user desires to completely erase the information on the image transmitted from digital camera A.

In the second aspect, the history information corresponding to the file of the transmitted still image is left, and the information on the position of the file of the history information in the storage unit 20 is saved in the corresponding <content> tag. On the other hand, for the file of the still image which is no longer present in digital camera A, a description indicating that the file is not present is made (e.g., move is written between <url> and </url>). In this case, when the user again receives the moved file of the still image in the future, the history information analysis section 38A3 analyzes the descriptions in the history information received together with the file of the still image and the saved history information. As a result, the still image can be identified as the still image moved by digital camera A in the past (this is possible because detailed conditions of the transmission time are described between <sender> and </sender> during the move). Moreover, this aspect makes it possible for digital camera A to deal with the history information to which the description has been added by digital camera B, when the history information to which the description has been added by digital camera B is sent from digital camera B after the move as explained above. This aspect can be carried out when the user desires to obtain the history information for the transmitted still image after the move of the image as well.

In the present embodiment, these two aspects are selectable by the user of digital camera A by use of the input interface 30, for example, from a menu displayed on the display unit 24.

Now, how the administration information in digital camera B which has received the still image is handled is mentioned. When the reception of the still image by digital camera B is a copy, both the files of the still image and the history information are present in the storage unit 20 of digital camera B. Therefore, if the received still image is a still image received for the first time (this is judged from a comparison of the received history information with the history information stored in digital camera B), a <content> tag may be newly provided in the administration information of the digital camera to write the positions of the received image and the history information in the storage unit 20 of digital camera B. On the other hand, the reception of the still image by digital camera B is an access, the file of the still image does not remain. Thus, there are two aspects of the description of the administration information of digital camera B in accordance with whether to erase the history information as well or to only leave the history information. These two aspects are similar to those in the above-mentioned case of a move in digital camera A, and are not explained in detail here. Effects of the respective aspects are also similar.

Figure 7:
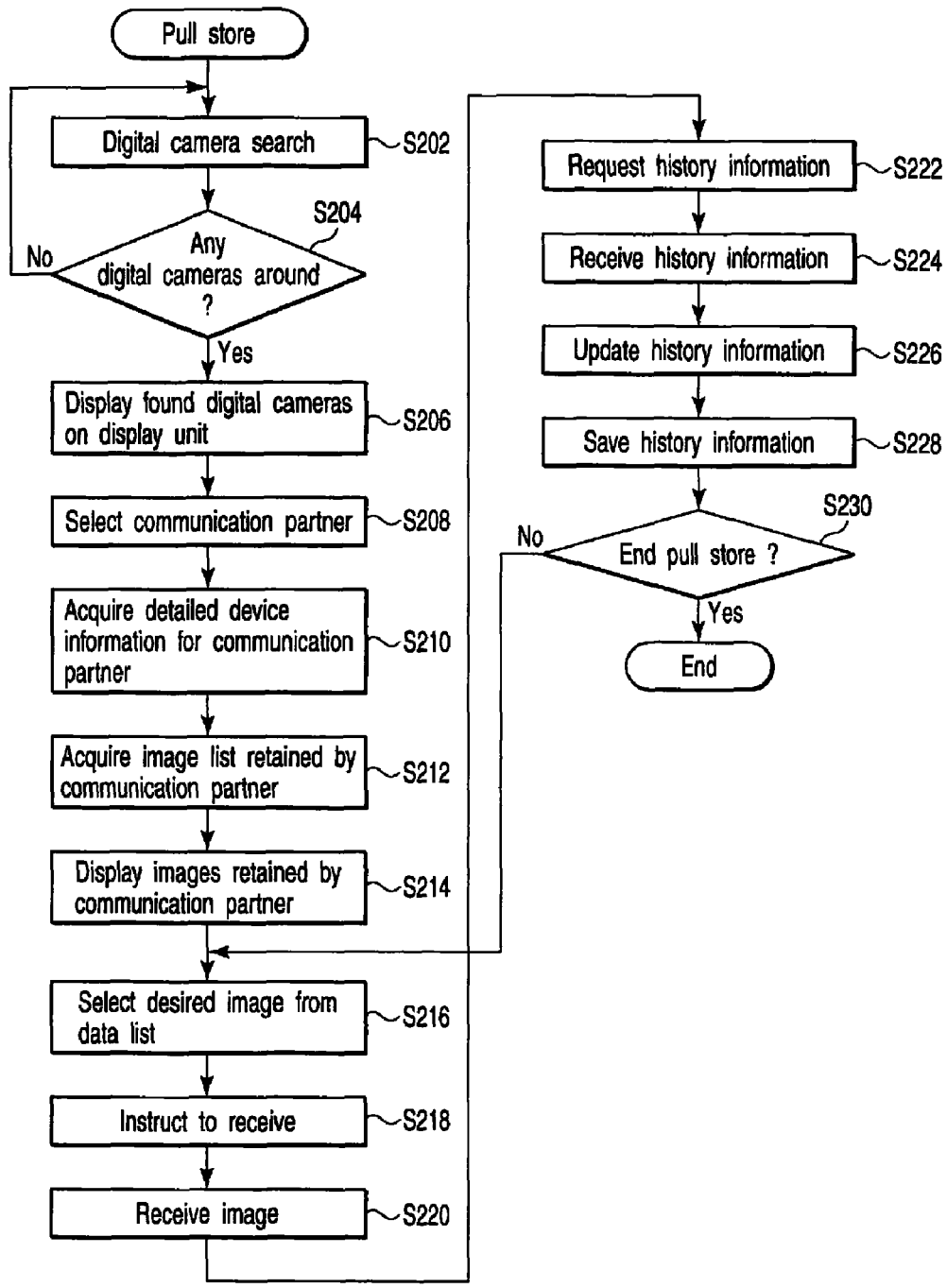
FIG. 7 is a flowchart of the processing of the digital camera when a still image is received by pull store.

FIG. 7 is a flowchart showing a flow of the processing (pull store) in which one digital camera 10 receives a desired still image and the file of the history information of this still image from the digital camera 10 which is the partner in the transmission/reception, in the case where two digital cameras 10 perform transmission/reception one to one by wireless. Hereinafter, the digital camera 10 owned by the user at the transmitting end is referred to as digital camera C.

After the start of the flow shown in FIG. 7, the user first selects a mode for causing digital camera C to search for a communication partner (step S202). As an example of a searching method, the device discovery in Universal Plug and Play (UPnP) which is a general standard technique can be used. As a result of using the device discovery, peripheral digital cameras available for communication response to digital camera C. When there is no response (step S204 branches to NO), digital camera C continues the device discovery.

When the peripheral digital cameras 10 available for communication response to digital camera C (step S204 branches to YES), digital camera C displays a screen for selecting a digital camera as the communication partner (step S206), and urges the user of digital camera C to select a digital camera as the communication partner. In this case, digital camera C displays the screen for selecting a digital camera as the communication partner on the basis of the type and name of the digital camera 10 contained in the response.

FIG. 8A shows a display example of such a screen for selecting a digital camera. Candidates (the camera A, the camera B and the camera D) for the communication partner are displayed on the display region 24A of the display unit 24 of digital camera C, and selectable by the user.

For explanation, it is assumed below that the camera B (hereinafter referred to as digital camera B) is selected (step S208). Digital camera B is preferably preset regarding how to response to a communication request from digital camera C. The reason is that if digital camera B responses to the communication request from digital camera C without any restriction, the still images stored in the storage unit of digital camera B are freely accessed or acquired by the user of digital camera C as explained below. In this respect, for example, it is possible for the user of digital camera B to grant a permission to the communication request from digital camera C. It is also possible that digital camera B does not respond unless digital camera C goes through authentication of, for example, a password for accessing digital camera B. Such processing is not explained below for simplicity.

Digital camera C acquires more detailed device information from digital camera B (step S210). The detailed device information includes a file list (easily extractable from the administration information in digital camera B) stored in digital camera B and a list of thumbnail images (step S212). Therefore, the user can display the still image saved in digital camera B on the display unit 24 of digital camera C (step S214). Then, the user of digital camera C selects a desired still image to be received out of the still images saved in digital camera B (step S216).

FIG. 8B shows how the still images stored in digital camera B are displayed as thumbnail images in the display region 24A of the display unit 24 of this digital camera C and selectable by the user of digital camera C. The user selects an image to be received via the input interface 30 of digital camera C, and adjusts the cursor onto an acquisition button, and then gives an instruction (HTTP GET) to receive this image through the input interface 30 (step S218).

Digital camera B which has received the HTTP GET command refers to the administration information to specify the history information corresponding to the still image for which the instruction has been issued, and updates the history information by adding transmission information for digital camera B itself to the file of the history information.

Specifically, digital camera B adds a part starting with <sender> and ending with </sender> to the history information. Examples of items written in this part includes, the name of digital camera B which is to transmit the still image, transmission date and time, a place where the transmission is carried out, a transmission method, etc. The method of acquiring the transmission place has been explained in connection with the push store and thus is not repeatedly explained. Moreover, as the above-mentioned transmission method, the present embodiment can select a case where a still image remains in the storage unit 20 of digital camera B after the transmission of this still image (referred to as a "transfer" in accordance with the case of the push store) or a case where a still image is deleted from and does not remain in the storage unit 20 of digital camera B after the transmission of this still image (also referred to here as a "move").

Whether digital camera B carries out a transfer or a move should originally be selected by the user of digital camera B. For example, it is preferable that the user of digital camera B can set so that a move in which the still image from digital camera B is deleted is not carried out and a transfer is always carried out when the user of digital camera B is absent.

In the present embodiment, move is written in the history information in the section starting with <method> and ending with </method> in the case of a move so that it is possible to know from the history information whether digital camera B at the transmitting end has the still image which has been transmitted. On the contrary, when the still image is transferred, nothing is written in the section starting with <method> and ending with </method>.

Then, digital camera C receives the still image from digital camera B (step S220). Digital camera C temporarily stores the received still image in the RAM 18. Then, a request to acquire the updated history information is made to digital camera B by the HTTP GET command (step S222). Digital camera B which has received the request for the history information transmits the above-mentioned updated history information to the digital camera, and digital camera C receives the updated history information (step S224). There is also a possibility that digital camera B previously acquires the device information on digital camera C as well as the history of the transmission, and adds the history of the reception of this information to the history information and transmits them to digital camera C.

Digital camera C temporarily saves the history information in the history information storage section 20A. In the case of a still image which has been received for the first time, history information is newly generated in digital camera C. At this point, digital camera C updates the stored history information by adding the device information on digital camera C itself thereto (step S226). Specifically, digital camera C passes the received history information to the history information analysis section 38A3 of digital camera C, and extracts the values of tags in the history information. Then, a largest <histID> tag is retrieved, and a <receiver> tag is created by the history information update section 38A4 after the </sender> tag described in the <histID> tag by digital camera A. The history information added by digital camera C is a description from <receiver> to </receiver>. Items that are added are about the same as the description from <sender> to </sender> added by digital camera B, and in the present embodiment, are the name of digital camera B, reception date and time, a reception place and a reception method. These items except for the reception method are not explained because corresponding tags and a method of obtaining described content are similar to those in the case of digital camera B explained above. For the reception method, there are a case where the still image recorded and temporarily stored in the RAM 18 is stored in the storage unit 20 (also referred to here as a "copy") and a case where the still image temporarily stored in the RAM 18 is not stored in the storage unit 20 and deleted (also referred to here as an "access"). In the case of a copy, copy is written in the section created by digital camera C starting with <method> and ending with </method>, so that it is apparent from the history information that the still image received by digital camera C is stored in the storage unit 20. On the other hand, in the case of an access, nothing is written in this section. Digital camera C stores the updated history information in the history information storage section 20A (step S230).

Then, when the user of digital camera C desires to further receive a desired image in digital camera C from digital camera B by the pull store processing explained above (step S230 branches to NO), the flow returns to step S216, and the user again starts to select an image to be received. When the user of digital camera C desires to end the pull store processing, the processing is terminated and flow is ended (step S230 branches to YES). There is also a possibility that digital camera C transmits the updated latest history information to digital camera B and shares the history information with digital camera B.

Hereinafter, how the administration information of the digital cameras B and C are handled in the pull store processing is the same as in the case of the push store and thus will be mentioned. There are two aspects of handling the administration information with regard to each of the cases: a case where digital camera B at the transmitting end performs a move and a case where digital camera C at the receiving end performs an access. Effects of these aspects are also similar to those in the case of the push store.

When the history information shown in FIG. 3 is again read with reference to the explanation made so far, it can be understood from the history information in FIG. 3 that two transmissions/receptions are carried out (for the same still image). If the digital cameras A, B and C are matched to dev001, dev002 and dev003, respectively, it can be understood that this history information conforms to the examples explained for the push store and the pull store. That is it can be understood that this history information shows that the still image taken by digital camera A has been transmitted to digital camera B by the push store and the still image has been received by digital camera C from digital camera B by the pull store. However, it can also be understood that this history information shows that digital camera B has push-stored <histID id=0002> in digital camera C. Thus, whether a request has been made from a receiving end or a transmitting end is not judged from the history information in the present embodiment. However, in order to be able to judge this, there is also a possibility of an embodiment in which an additional description is made in each of the <histID> tags.

[Second Embodiment of Transmission and Reception (Multicast to Communication Network)]

Next will be explained the transmission and reception of the history information in the digital cameras connectable to a network. The digital camera can be connected to the Internet to transmit and receive still images to and from other digital cameras via the Internet. In this case, as has been explained in the first embodiment of the transmission/reception, the history information in which additional description has been made in the digital camera at the receiving end is returned to the digital camera which has transmitted the relevant still image immediately before. Further, the history information in which the additional description has been made in the digital camera at the receiving end is distributed (multicasting based on IP addresses, serial numbers of the devices) as the latest history information to a plurality of digital cameras which have transmitted and received this still image in the past. Thus, the latest history information can be shared among the digital cameras conforming to the network. In the digital camera which has transmitted this still image in the past, it is also possible to know which digital camera the still image has been transmitted to.

The digital camera 10 does not necessarily have to be always connected to the network. Therefore, if the digital camera 10 is not connected to the network at the point where this digital camera 10 transmits-receives the still image, the history information for this still image is multicast when this digital camera is connected to the network next. To this end, it is possible to add information for the multicasting into the <content> tag of the administration information of the digital camera corresponding to this still image. For example, it is possible to insert a description "<state>not-cast</state>" into the target <content> tag. For example, IP addresses are written together to store the fact that which device has not been connected to the network. The digital camera 10 searches the description of the administration information when connected to the network next time. When the digital camera 10 finds the inserted description, the digital camera 10 multicasts the corresponding history information onto the network to the IP addresses written therewith, and deletes the description "<state>not-cast</state>" or the IP addresses written together.

In the multicasting, the latest history information is distributed to all the digital cameras which have transmitted this still image in the past, by way of routers on the network.

Furthermore, in multicasting, there is a possibility that different history information from a plurality of digital cameras for the same still image crosses in the router on the network. For example, assume that digital cameras A and A' receive latest updated history information α regarding the same still image which has been received in the past and store the history information α in the history information storage sections 20A thereof. In this case, assume further that digital camera A has created history information β added to the history information α and indicating that digital camera A has transmitted the still image to digital camera B. Still further, assume that digital camera A' has created history information β' added to the history information α and indicating that digital camera A' has transmitted the still image to digital camera B'. It is supposed that both the history information β and the history information β' are received by way of the routers on the network as the latest history information by digital camera C connected to the network. In this case, the history information analysis section 38A3 of digital camera C which has received this history information analyzes the transmission data within the latest <histID> tag of each history information. Then, the history information update section 38A4 edits these two pieces of history information to create one piece of history information described in a consistent time series.

There have been explained above the aspect in which the digital camera which has moved the still image not only deletes the history information corresponding to the transmitted still image but also deletes the description of this still image from the administration information, and the aspect in which the digital camera which has accessed the still image also deletes the history information corresponding to the received still image and describes nothing for the still image in the administration information. In such cases, there is a possibility that these digital cameras receive via the network the history information which is no longer present even in the administration information due to the above-mentioned multicasting. In this connection, the user can set so that even if corresponding history information is received in the future during a move or an access of the still image, this history information is destroyed without being recorded (and without even informing the user).

Instead, for example, the user can set so that when the history information for this still image is received in the future, the user is informed of this reception and selects whether to again record the history information corresponding to this still image (and whether to restore the corresponding administration information). This setting can be selected by the user through the input interface 30 from a selection screen displayed in the display region 24A of the display unit 24 of the digital camera 10. When these settings are made, setting files for saving these settings can be stored in the storage unit (not shown). However, in the case of the above-mentioned setting to destroy the history information without recording (and without even informing the user) even if the history information is received), it is preferable to set so that this setting is not left as setting files. That is, when receiving the history information in the future, the digital camera 10 performs such processing as to destroy the history information without recording on the basis of the fact that nothing is described in the setting files regarding the settings for this history information. This can prevent the digital camera 10 from wasting the capacity of the storage unit 20 by unlimitedly saving the setting files of the processing performed when the history information for the still image which has once been transmitted/received by this digital camera 10 is received.

FIG. 9 shows an example of a description added to the history information corresponding to a certain still image by the digital camera 10 (dev001) which has deleted or modified this still image.

In the present embodiment, when a still image is deleted by the digital camera 10, delete is written in the <method> tag within a <notify> tag of the corresponding history information. Delete is also written in the <url> tag of the administration information corresponding to this still image. Moreover, when this digital camera conforms to the network and has not yet transmitted this history information to which the descriptions have been added, the description "<state>notcast</state>" is inserted into the corresponding <content> tag of this still image in accordance with the above-mentioned example. The processing of the digital camera 10 performed when the digital camera 10 is connected to the network next is similar to the processing in the case of a move and an access explained above, and is thus not explained. It is preferable that the user of the digital camera 10 which has deleted the still image can determine setting as to whether to delete both the history information and the administration information or to leave the history information and the administration information at the time of the deletion of the still image after the multicasting of the history information. These settings can be provided as additional descriptions by further providing special tags in the corresponding <content> tag of the administration information. Then, the digital camera 10 can operate in accordance with the additional descriptions when performing processing in the future. This is not explained in detail here. Moreover, a processing method is not limited to this example. Effects of these settings at the time of the deletion of the still image are similar to the effects in the case of a move and a transfer (or an access and a copy), and are not explained.

Furthermore, in the present embodiment, when a still image is modified by, for example, image processing in the digital camera 10, modify is written in the <method> tag within the <notify> tag of the corresponding history information. However, no modification is made in the description in the <content> tag of the administration information corresponding to this still image (except for the case where the file name and directory positions are changed in accordance with the image modification). When this digital camera 10 conforms to the network and has not yet transmitted this history information in which additional descriptions have been made, the processing similar to that in the case of the deletion is performed. No repeated explanation is given here. When this modification is, for example, a mere change of the file name, this is dealt with by modifying the administration information and no description is added to the history information. When the history information in which the modification of the still image is additionally described is multicast to the network, the modification of the still image in a certain digital camera 10 can be known to other digital cameras having this still image. Moreover, when the modified still image is transferred from the digital camera storing this image, the user can be provided with various pleasures regarding one still image. That is, the user can easily obtain the still images processed by other persons, and enjoy comparing these still images with his/her own still image.

If the digital camera 10 stores the still image before the modification of this image by another user when this modified image is received by another user, the history information before the modification and the history information after the modification overlap. In order to deal with this, the positions of the two images in the storage unit 20 can be written together into the same <content> tag within the administration information. Alternatively, a new <content> tag can be provided in the administration information to provide information on the image after the modification in the new <content> tag. There is not much difference between these options, and the user can freely select either method to store the modified still image.

When the still image is modified in the digital camera 10 as mentioned above, exclusive modification information for describing the modification may be stored as another file instead of the method in which the history information indicating the modification is added. In this case, the target still image is associated with two pieces of history information including the normal history information and the modification history information. Such association can be achieved by writing tags indicating the positions of the two pieces of history information in a directory into the file of one still image within the <content> tag of the administration information. However, the present invention is not limited to this method, and this method is not explained here in detail. For example, when a person desires to keep the still image modified by himself/herself secret and therefore desires other users not to know the fact the this person has modified the still image, a description can be added to the modification history information without multicasting this modification history information.

[Third Embodiment of Transmission and Reception (When History Information Administration Server on Communication Network is Used)]

Explained now is an embodiment in which the history information is not only administered by the history information storage section 20A of the digital camera 10 but also administered by a history information administration server on a network in a consolidated manner. In the following explanation, the digital camera 10 is a network device connectable to the network.

Figure 10:
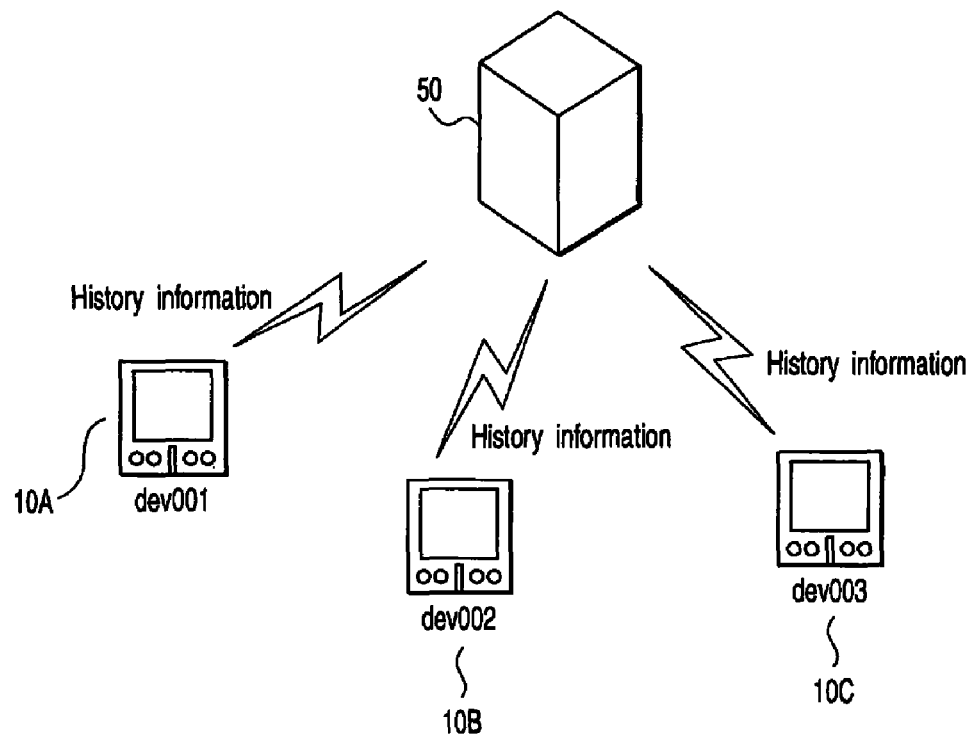
FIG. 10 is a diagram showing a history information administration server, and a plurality of digital cameras transmitting/receiving history information to/from the history information administration server.

FIG. 10 shows a history information administration server 50, and a plurality of digital cameras 10A, 10B and 10C which can transmit/receive the history information to/from the history information administration server 50 via the network. The digital camera 10 can transmit/receive the history information to/from the history information administration server 50 by the history information acquisition section 38A2 and the history information output section 38A5 connected to the communication unit 32 via the communication control unit 34. It is to be noted that the descriptions in the history information in the present embodiment are as those shown in FIGS. 3 and 9 and are therefore not repeatedly explained. Moreover, the descriptions in the administration information in the present embodiment are as those shown in FIG. 4 and are therefore not repeatedly explained.

Figure 11:
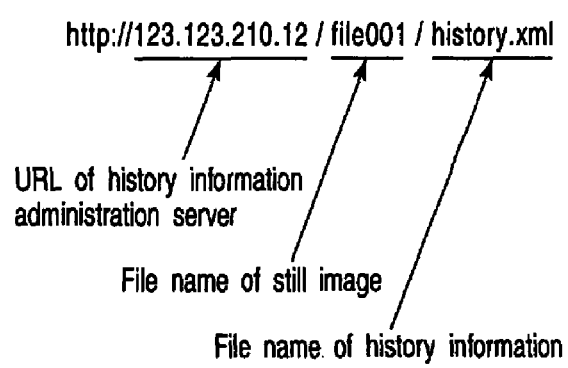
FIG. 11 is a diagram showing an example of the specification of the location of the history information stored in the history information administration server.

FIG. 11 shows one example of the specification of the location of the history information in the history information administration server 50. In order that the history information administration server 50 and the digital cameras 10A to 10C transmit/receive the history information to/from each other, the digital cameras 10A to 10C have to specify the position of the history information administration server 50 on the network and the position within the history information administration server 50 of the history information recorded in this history information administration server 50. For example, when the history information is transmitted/received by way of HTTP, the specification is made up of URL (123.123.210.12) of the history information administration server, a directory name (file001) generated from the file name of a still image, and a file name (history. html) of the history information stored in this directory.

In this example of transmission/reception by way of HTTP, the digital cameras 10A to 10C can transmit the HTTP GET command to the history information administration server 50 to acquire the history information. The history information administration server 50 which has received this HTTP GET command transmits the requested history information to the digital cameras 10A to 10C which has transmitted the command. Further, when the history information is updated, the digital cameras 10A to 10C can transmit (upload) the updated history information to the history information administration server 50. This transmission can be carried out when the digital cameras 10A to 10C execute the HTTP POST command for the history information administration server 50.

When the digital cameras 10A to 10C are not always connected to the network, processing can be similar to that in the case of the transmission of the history information by multicasting using the above-mentioned <state> tag. That is, a description indicating that the latest history information in the administration information in the digital camera 10 has not been uploaded yet can be made in the <content> tag such that the history information is automatically updated when the digital camera 10 is connected to the network next time. This is similar to the case of the multicasting and is not explained.

In the case of sharing the history information using multicasting, there is a possibility of a phenomenon in which a plurality of pieces of different latest history information cross in the router on the network (corresponding to the above-mentioned example of the history information β and β'). The digital camera 10 has to edit the plurality of pieces of different history information in a consistent manner. Even when the history information is administered using the history information administration server 50, it is preferable that the digital cameras 10A to 10C have such an automatic editing function because they can be compatible with various forms of sharing the history information. However, if the history information administration server 50 operates to properly update the history information on receipt of the plurality of pieces of history information transmitted, no problem occurs such as one caused in the router for multicasting. Only one piece of latest history information can be transmitted to the digital cameras 10A to 10C which do not have the above-mentioned history information editing function. In addition, when the history information to which the HTTP GET request has been made is being edited due to, for example, the upload of the history information from another digital camera 10, the history information administration server 50 can transmit information that the history information is being edited, to the digital camera 10 which has made the HTTP GET request. Moreover, the history information administration server 50 can also transmit similar information to the digital camera 10 which has made the HTTP POST request. In this case, the digital camera 10 receiving this information can leave the description (i.e., the description "<state>not-cast</state>") which indicates that the upload has not yet been carried out and which is located in the <content> tag concerning this history information described in the administration information within this digital camera 10, and delete the description after the upload is finished.

Alternatively, for example, there is a possibility that the file name of the history information shown in FIG. 11 is created by the history information administration server 50 and transmitted to all the digital cameras 10 for which descriptions are made in the history information that they have transmitted/received the still image. Specifically, this is carried out in the following manner. The file names of the history information are controlled to prevent the file names of the history information stored in the same directory from overlapping by, for example, adding IDs created in accordance with the uploading order of the history information onto the administration server 50. Further, the history information administration server 50 transmits the file name of the history information newly formed in this manner to all the digital cameras 10 which are written in the received history information and which have transmitted/received this still image. The digital camera 10 which has received this information adds a description such as "<network_history>http://123.123.210.12/file001/history__02375218.xml</network_history>" into the <content> tag of the administration information corresponding to the above-mentioned still image (note that in this description example, history__02375218.xml is the file name of the history information created by the history information administration server 50 to avoid an overlap. The digital camera 10 in which such a description has been added uses, from now on, the address in the newly provided <network_history> tag when transmitting/receiving the history information for this still image. Moreover, the received history information is written into a history information file present in a directory described in the <history> tag within the <content> tag in the administration information concerning this history information. The name of this history information file stored in the digital camera 10 does not have to coincide with the name of the history information file created by the history information administration server 50. Thus, the digital camera 10 connectable to the network has, within the <content> tag of the administration information, a pair of tags consisting of <history> (expressing the position in the digital camera 10 of the history information of the still image of the digital camera 10) and <network_history> (expressing the position on the network of the history information of the still image of the digital camera 10). (For example, in the example of the description of administration information shown in FIG. 4, <history>./history__001.xml</history> and <network_history>http://123.123.210.12/file001/history__02375218.xml</network_history> are written together in <contentID id=0001>. Thus, even if the file name stored in the storage unit 20 of the digital camera 10 is modified, the history information administration server 50 can be accessed as before the modification.

Furthermore, when both the <history> tag and the <network_history> tag are once written in the <content> tag of the administration information as mentioned above, there can be an aspect in which the description of the <history> tag alone is deleted and the <network_history> tag alone is described. In this case, the digital camera 10 does not store the history information in the history information storage section 20A of the digital camera 10. When the digital camera 10 needs the history information, the digital camera 10 can connect to the communication network to acquire the latest history information from the history information administration server 50 on the communication network described in the <network_history> tag. It is possible to enable the user of the digital camera 10 to select whether to leave the <history> tag for each still image.

Moreover, the history information administration server 50 may store not only the history information but also the still image in association with the history information.

On the other hand, in the second and third embodiments of the transmission/reception explained above, the wireless communication includes wireless local area network (LAN) and Bluetooth (registered trademark) using radio waves (it should be noted that the device discovery in the first embodiment is a device searching method conforming to Bluetooth), ultra wide band (UWB), etc., and also includes, for example, infrared data association (IrDA) using infrared rays. Moreover, not only the wireless communication but also wired communications such as Ethernet (registered trademark), universal serial device (USB) and IEEE 1394 are applicable.

In addition, it is preferable that the transmission/reception of the still image and the history information includes, for example, general encryption processing such as temporal key integrity protocol (TKIP) or advanced encryption standard (AES) for transmission/reception only among users permitted by each other, and an authentication procedure using media access control (MAC) address filtering or service set identifier (SSID). The authentication procedure and the encryption processing are carried out by the communication unit 32 and the CPU 38.

Now, there will be explained, with reference to the drawings, a method of displaying the history information in the digital camera 10 as the information processing device in one embodiment of the present invention.

As explained above, the history information is saved in the history information storage section 20A of the storage unit 20. The history information is read from the CPU 38 of the digital camera 10 into the storage control unit 22 and expanded in the RAM 18. As the history information is described in XML format, the history information has to be passed to the history information analysis section 38A3 in order for the digital camera 10 to analyze the information. Then, the CPU 38 acquires an analytic value by the history information analysis section 38A3, such that it is possible to judge what is described in which tag of the history information. Moreover, the history information display control section 38A6 acquires a display instruction from the CPU 38 to control the display control unit 26 such that the indication regarding this history information can be displayed on the display unit 24.

[First Embodiment of History Information Display (Normal Display)]

Figure 12:
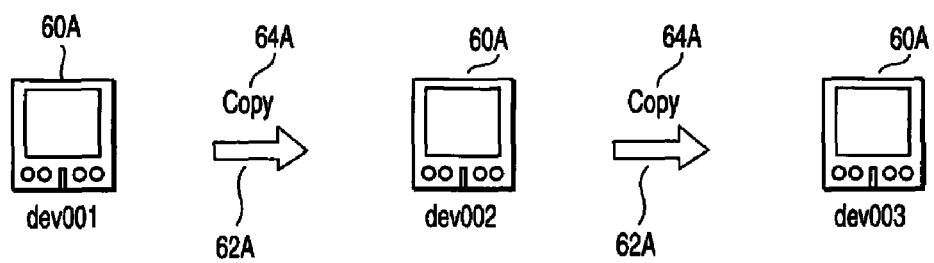
FIG. 12 is a diagram showing an example of the display of the history information when the history information is accessed on a display unit of the digital camera which last received a still image transmitted and received twice to and from the digital camera that had created the still image.

FIG. 12 shows a display example wherein the history information is accessed on the display unit 24 of the digital camera which last received a still image transmitted and received twice to and from the digital camera 10 (dev001) that had created the still image. This history information is the history information shown in FIG. 3.

In a situation shown in this display example, the still image taken by the digital camera 10 named dev001 using the imaging unit 12 is transmitted to the digital camera named dev002, and dev002 further transmits the still image to the digital camera named dev003. This display example is the history information displayed on the display unit 24 of dev003. Values (numerical values and characters) written in the tags <histID>, <devicename> and <method> are used as the history information in order to indicate the history information display.

The digital cameras (dev001, dev002 and dev003) are indicated with normal device icons (icons of devices having the still image) 60A, and an arrow icon 62A showing the direction of the transmission/reception of the still image is indicated between the device icons 60A. Moreover, copy icons 64A showing the kind of transmission/reception are indicated above the two arrow icons 62A, respectively.

Figure 13:
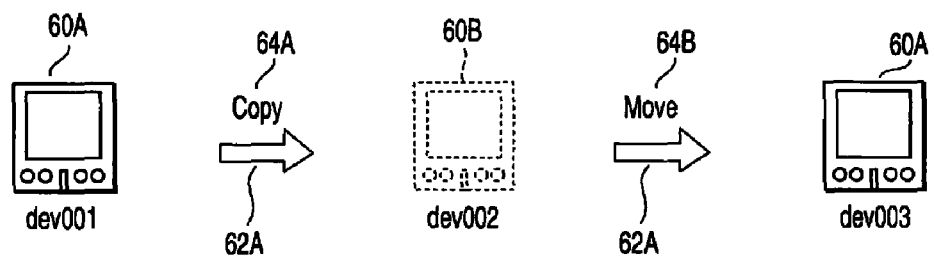
FIG. 13 is a diagram showing an example of the display of the history information when a still image is moved from a digital camera to a digital camera.

FIG. 13 shows an example of the display of the history information when the still image is moved from dev002 to dev003. Move is written in <method> of the history information in this case. The history information analysis section 38A3 extracts the value in this <method> section, and reports to the CPU 38 whether the still image has been transferred or moved. A device icon (icon of the device which does not have the still image) 60B of dev002 which does not have the still image is indicated differently from the device icons 60A of the digital cameras 10 (dev001 and dev003) which have the still image, so that its icon indicating the kind of transmission/reception is a move icon 64B instead of the copy icon 64A. In addition, when the storage unit 20 of dev002 has neither the image nor the history information (thus, nor the corresponding administration information), the display as shown in FIG. 13 is only possible for dev003 (for dev001 as well if the history information is also shared with dev001 by the above-mentioned multicasting to the network or by the history information administration server 50).

Figure 14:
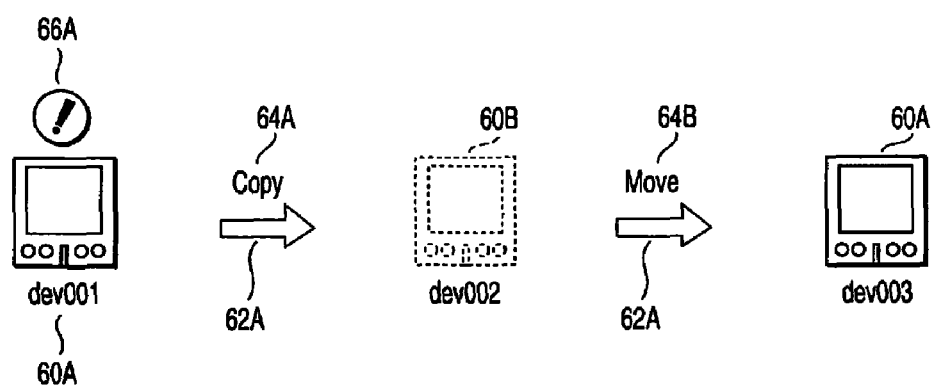
FIG. 14 is a diagram showing an example of the display of the history information when the still image saved in the digital camera (dev001) shown in FIG. 13 has been modified in the case where the respective digital cameras are connectable to a network.

FIG. 14 shows a display example wherein the still image saved in dev001 shown in FIG. 13 has been modified in the case where the respective digital cameras 10 are connectable to the network. If the still image is modified, the description as shown in FIG. 9 is added to the history information associated with the still image. When the history information is analyzed by the history information analysis section 38A3 and the result of the analysis is indicated in the display region 24A of the display unit 24, the display example as shown in FIG. 14 is indicated. In this case, the value of <method> in the <notify> tag indicates modify. In the present embodiment, a modification icon 66A shown in FIG. 14 representing the modification of the still image is indicated above the device icon 60A of digital camera dev001 which has modified the still image. As a result, it can be recognized at a glance in dev003 (in dev002 as well if dev002 is set to receive the latest history information even after the move of the still image, and naturally, in dev001 as well) that the still image stored in digital camera dev001 has been modified. It should be understood that the modification icon 66A representing the modification may be indicated at a position other than the position above the device icon 60A of digital camera dev001 as long as it is indicated in the vicinity of the device icon 60A.

Figure 15:
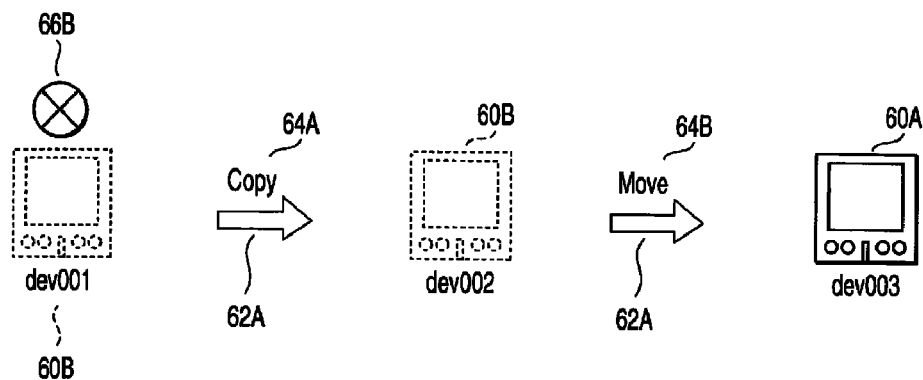
FIG. 15 is a diagram showing an example of the display of the history information when the still image stored in the digital camera (dev001) shown in FIG. 13 has been deleted in the case where the respective digital cameras are connectable to the network.

FIG. 15 shows a display example in which the still image stored in dev001 has been deleted. In this case, the value of <method> in the <notify> tag of the history information is set to delete. This display makes it possible to recognize in dev003 (in dev002 as well if dev002 is set to receive the multicast latest history information even after the move of the still image) that the still image stored in dev001 has been deleted. It can be easily recognized that this still image stored in dev003 is not stored in other digital cameras dev001 and 002. In the present embodiment, a delete icon 66B showing that the still image has been deleted is indicated above the device icon 60B of digital camera dev001 which has deleted the still image, the device icon 60B showing that digital camera dev001 does not have the still image. This delete icon 66B is not limitedly indicated above the device icon 60B and may be indicated at other positions as long as the association with the device icon 60B is clear. For example, when a given length of time has passed after the execution of the display shown in FIG. 15 or when the display of the history information is once canceled and then the history information is again displayed, the indication of the delete icon 66B shown around the device icon 60B of digital camera dev001 may be stopped so that the device icon 60B alone is indicated in the same manner as digital camera dev002.

Figure 16:
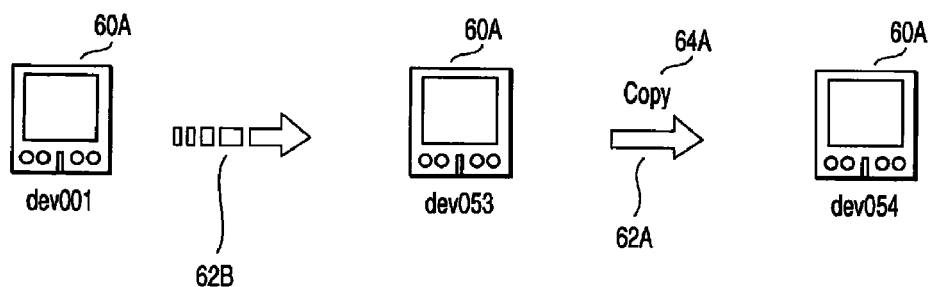
FIG. 16 is a diagram showing an example of the display of the history information when described content in the history information has increased.

FIG. 16 shows an example of the display of the history information when described items in the history information have increased. In the present embodiment, the history information is described in XML as shown in FIGS. 3 and 9. If the number of transmissions/receptions or modifications of a still image increases, the amount of data written in the history information also increases. Then, when the increased history information is analyzed and displayed as mentioned above, the number of device icons that can be displayed is limited due to the physical size of the display region 24A of the display unit 24. For example, when the display unit 24 is an LCD, the amount of information that can be displayed varies depending on an LCD of a VGA size (640×480) and an LCD of a QVGA size (320×240). For example, if the history information of an image which has been transmitted/received 50 or more times is analyzed, 50 or more icons are needed. This is not a number that permits an actual display in the display region 24A limited in the physical size as mentioned above (even if it can display, such a display is less than clear to the user of the digital camera 10). In the present embodiment, the display is achieved so that the user can easily recognize the history of the transmission/reception of the still image even in such a case as explained below.

In the display example shown in FIG. 16, digital camera dev001 which has created the still image, and digital cameras dev053 and dev054 which are regarded in accordance with the history information as having carried out transmission/reception most recently are indicated by the above-mentioned device icons 60A. The display example in FIG. 16 is indicated on the display unit 24 of digital camera dev054. For the transmission/reception in the digital cameras dev002 to dev052, dashed arrow icons 62B shows that the indication of the history information is omitted (naturally, there can be a digital camera which carries out a plurality of transmissions/receptions, but it is assumed for simplicity that the digital cameras in this example do not include such a digital camera). Processing to display desired history information from this display state is explained below.

Figure 17A:
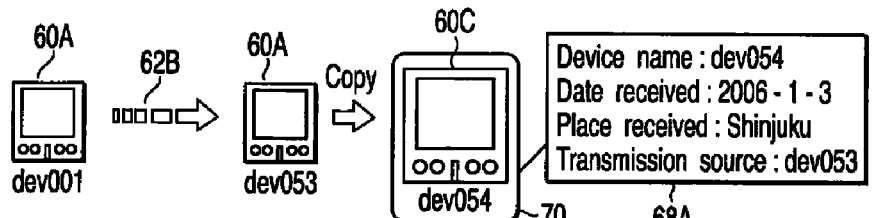
FIG. 17A is a diagram showing a display example in which a shift is made from a display state shown in FIG. 16 into a history display mode.

FIG. 17A shows a display example in which a shift is made from the display state shown in FIG. 16 into a history display mode. The input interface 30 of the digital camera 10 is operated to enter the history display mode. Entering this history display mode, detailed data on digital camera dev054 to which a cursor 70 is adjusted is indicated by a pop-up display 68A as shown in FIG. 17A. The indicated detailed data can be obtained by analyzing the history information in the history information analysis section 38A3 and acquiring the contents of each tag. This pop-up display 68A is indicated in the vicinity of each device icon selected by the operation of the cursor 70 using an operation switch of the input interface 30. In addition, a device icon 60C of digital camera dev054 to which the cursor 70 is adjusted is indicated larger than the device icons 60A of other digital cameras to which the cursor 70 is not adjusted (referred to as enlarged device icon 60C). This is intended to emphasize the digital camera 10 to which the cursor 70 is adjusted. However, the device icon 60C can also be embodied in a different indication color or in a flashing manner instead of the larger size. An icon indicated on the right or left can be selected by the operation switch of the input interface 30. Although not shown, it should be understood that such a history display mode can also be used when the number of device icons is not too large as shown in FIGS. 12 to 15.

Figure 17B:
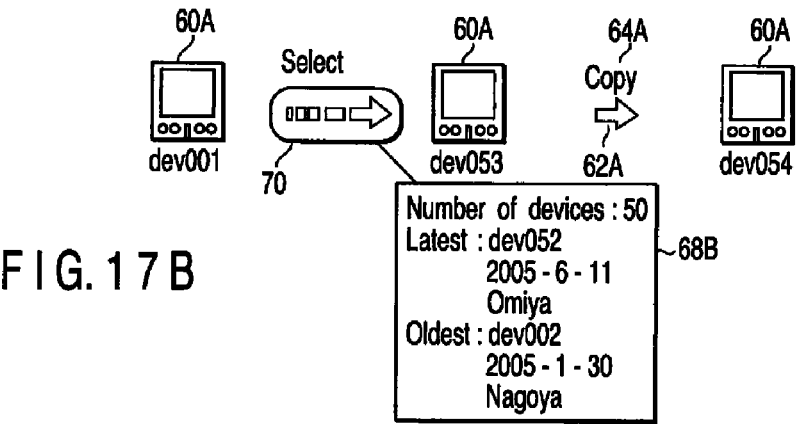
FIG. 17C is a diagram showing a display example in which the cursor is adjusted to the dashed arrow icon to issue a selection instruction.
FIG. 17D is a diagram showing a display example in which the cursor is moved to the left using an input interface of the digital camera from the display state in FIG. 17C.
Figure 17C:
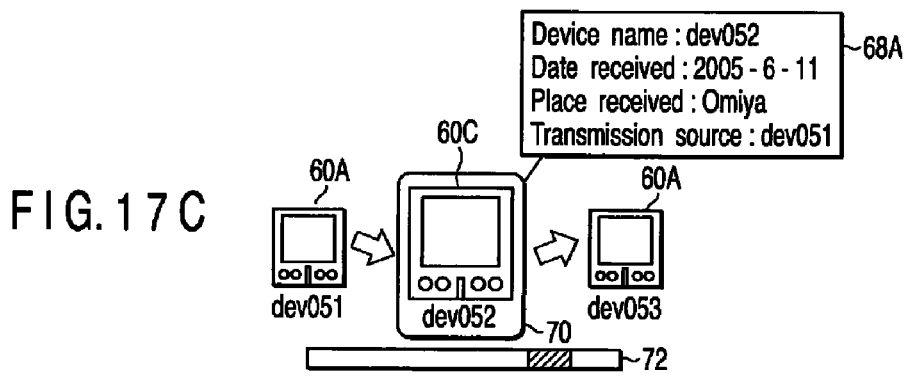
Figure 17D:
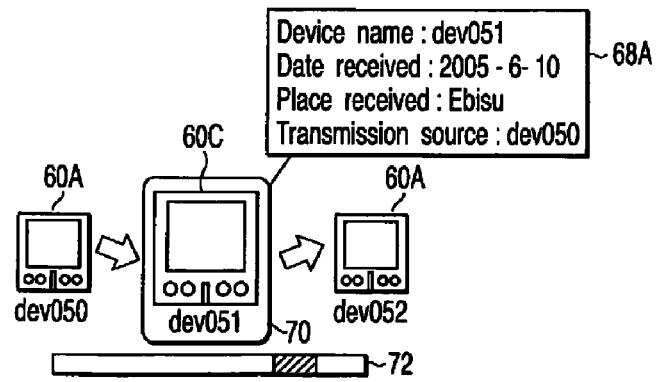

FIG. 17B shows a display example in which the cursor 70 is adjusted to a dashed arrow icon 62B. As explained above, when the cursor 70 is operated and adjusted to the dashed arrow icon 62B, the outline of the omitted history information is indicated by a pop-up display 68B. In the present embodiment, part of the history information for the digital camera omitted by the dashed arrow icon 62B is indicated in this pop-up display 68B. A selection instruction can be issued while the cursor 70 is being adjusted to the dashed arrow icon 62B. FIG. 17O shows a display example in which the cursor 70 is adjusted to the dashed arrow icon 62B to issue the selection instruction. When the selection instruction is issued, part of the omitted history information is displayed as shown in FIG. 17C. In the display example shown in FIG. 17C, two device icons 60A, and the enlarged device icon 60C to which the cursor 70 is adjusted are indicated in the display region 24A. It should be understood that the number of device icons that can be displayed is dependent on the display capability of the display unit 24, so that the number may be a number other than three. Moreover, in the present embodiment, the pop-up display 68A is associated with the enlarged device icon 60C to indicate the history information for the corresponding device. Under these three device icons, a scroll bar 72 is indicated to show the position within the history information of the digital camera 10 to which the cursor 70 is adjusted. The indicated position of a pointer in the scroll bar 72 makes it possible to know at which position within the history information the digital camera 10 to which the cursor 70 is adjusted has transmitted/received the still image. FIG. 17D shows a display example in which the cursor is moved to the left using the input interface 30 from the display state in FIG. 17C. When the cursor is thus moved to the right or left, the history information can be sequentially indicated as in FIG. 17D. As explained above, the icon 60C of the device to which the cursor 70 is adjusted is indicated larger than other device icons 60A. In the display example of the present embodiment, there is no indication as to whether the still image has been transferred or moved. However, depending on the display capability of the display unit 24, the displays as shown in FIGS. 12 to 15 can be executed in the display state as shown in FIG. 16 and FIGS. 17A to 17D.

Figure 18A:
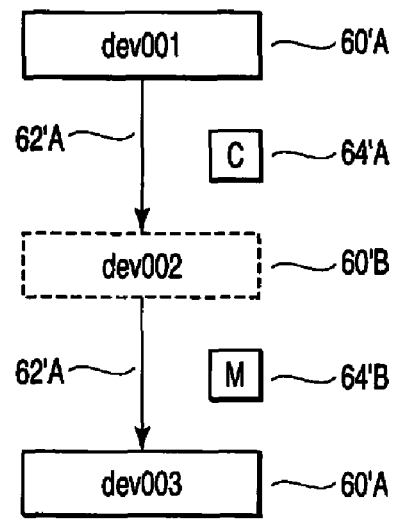
FIG. 18A is a diagram showing an example of the display of the history information when the display unit of the digital camera is not large enough to display icons.
Figure 18B:
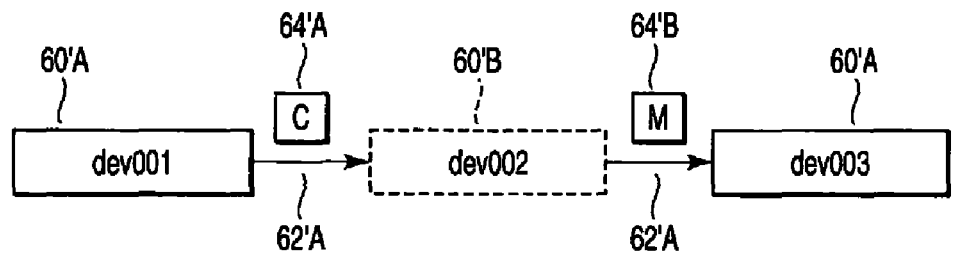
FIG. 18B is a diagram showing an example of the display of the history information when the display unit of the digital camera is not large enough to display the icons.

FIG. 18A and FIG. 18B show display examples in which the display region 24A of the display unit 24 of the digital camera 10 is not large enough to display the icons. When the display region 24A of the display unit 24 of the digital camera 10 is not large enough to display the icons, such a display method is employed as to let the user easily recognize the history information without providing a rich display as mentioned above. As shown in FIG. 18A, the history information only shows a device name and an image transmission/reception method instead of the icons. The display example in FIG. 18A shows a device name display 60'A which shows the device has the still image and in which the name of the digital camera is enclosed by a full line to demonstrate that this digital camera has the still image, a device name display 60'B which shows that the device has no still image and in which the name of the digital camera is enclosed by a dashed line to demonstrate that it does not have the still image, an arrow display 62'A indicating the direction of the transmission/reception of the still image, a copy display 64'A and a move display 64'B indicating the transmission/reception method. The transmission/reception method includes a transfer and a move, and the device name is enclosed by the dashed line when the still image is moved from this device in order to make a clear distinction between a transfer and a move as mentioned above. It is apparent that the distinction can also be made by changing the attribute (color, size, shape, etc.) of a font instead of enclosing by the dashed line. The flow of the transmission/reception of the still image is indicated so that upper ones are older and lower ones are newer in the display example shown in FIG. 18A, but depending on the limitation of the display region of the display unit 24, it is also possible to display so that older ones are on the left side and newer ones are on the right side as shown in FIG. 18B. It should be understood that other display methods are possible depending on the limitation of the display region of the display unit 24.

The above-mentioned examples of the display of the history information employs a display method based on IDs in the history information. However, in addition to the display method based on the IDs, other display methods are possible, such as a display method based on dates, a display method based on positions, etc.

Furthermore, the display examples of the present embodiment have been explained in connection with the case where the still image, that is, content data is transmitted from one digital camera to one digital camera, but the present invention can also be applied to a case where content data is transmitted, for example, from one digital camera to a plurality of digital cameras.

[Second Embodiment of History Information Display (Date Display)]

Hereinafter, a history information display method based on dates will be explained.

Figure 19A:
FIG. 19A is a diagram showing an example of the display of the history information using the association of the history information with date information.
Figure 19B:
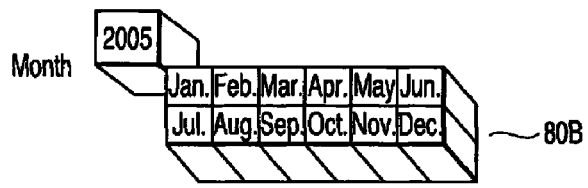
FIG. 19B is a diagram showing an example of the display of the history information using the association of the history information with the date information.
Figure 19C:
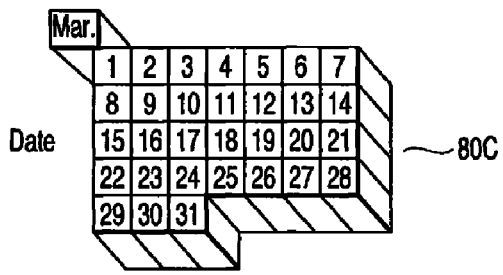
FIG. 19C is a diagram showing an example of the display of the history information using the association, of the history information with the date information.
Figure 19D:
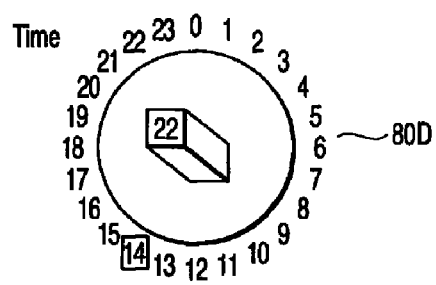
FIG. 19D is a diagram showing an example of the display of the history information using the association of the history information with the date information.
Figure 19E:
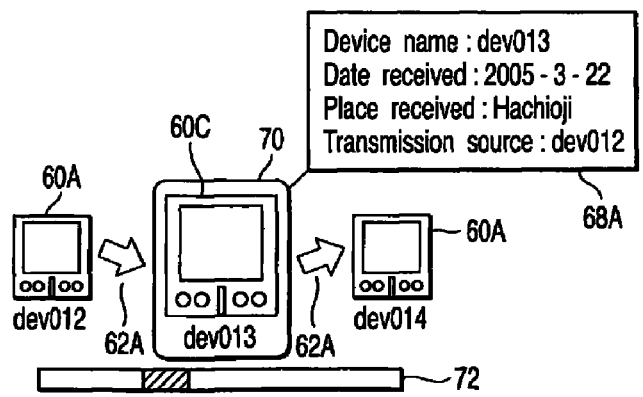
FIG. 19E is a diagram showing an example of the display of the history information using the association of the history information with the date information.

FIGS. 19A to 19E show examples of the display of the history information using the association of the history information with date information. In this method of searching the history information, a year selecting screen with a year icon 80A as shown in FIG. 19A is first displayed. If, for example, year 2005 is selected by the input interface 30, a month icon 80B from Jan. (January) to Dec. (December) as shown in FIG. 19B is displayed for the user to select a month. If, for example, Mar. (March) is selected in this screen, a date icon 800 from (date) 1st to (date) 31st as shown in FIG. 190 is displayed to select a date. If, for example, (date) 22nd is selected in this screen, a screen for specifying a time is provided and a time icon 80D is displayed in which an icon representing a clock is indicated around the (date) 22nd as shown in FIG. 19D. Then, if a time is specified, the history information regarding the transmission/reception at this time is indicated by the pop-up display 68A together with various icons as shown in FIG. 19E. The various icons have been explained above in connection with the first embodiment of the history information display (normal display) and are therefore not repeatedly explained. Icon history information shown in FIG. 19E does not necessarily have to be retrieved by the specification up to "time", and, for example, by the specification up to "March 2005", the history of transmission/reception in the specified month can be retrieved. If there is no history information on the specified date, dates before and after this date are searched for, and the history information for the date closest to the specified date can be displayed. Thus, even if the memory of the user regarding the transmission/reception of the still image is unclear, its history can be easily found by accessing the history information in the digital camera. Moreover, in the indications of "year", "month", "date" and "time", parts having the history information on the transmission/reception can be three-dimensionally displayed in uneven shapes with corresponding icons in accordance with the number of transmissions/receptions. Further, in the display of the device icons shown in FIG. 19E, one of the displays as shown in FIGS. 12 to 18 can be executed depending on the display limitation of the display unit 24 of the digital camera 10.

[Third Embodiment of History Information Display (Position Display)]

FIGS. 20A to 20C show examples of the display of the history information using the association of the history information with position information. The position information to be described in the history information may be acquired using positioning means within the position information processing unit 36 incorporated in the main body of the digital camera 10. Moreover, the position information to be described in the history information may be acquired from positioning means incorporated in an external device such as a mobile telephone. The present embodiment is explained on the assumption that the position information is acquired from the positioning means in the position information processing unit 36 of the digital camera 10. It is also assumed that the still image can be transmitted/received via the Internet.

The position information including the latitude, longitude, etc. as described in the history information shown in FIG. 3 is acquired from the positioning means in the position information processing unit 36. The position information obtained from the positioning means and described in the history information can be checked against map information stored in advance in the flash ROM 16 within the digital camera 10 or in the storage unit 20 in the form of, for example, a memory card that can be attached to and detached from the digital camera 10 such that a map corresponding to the position information described in the history information can be displayed. When the map is displayed in this manner, the user can easily obtain richer history information. For example, it is possible to easily know where a still image has been transmitted by what kind of digital camera and where the still image has been received by what kind of digital camera.

Referring to FIGS. 20A to 20C, there is explained how to retrieve history information from the position information described in the history information and display the history information as an icon on the display unit 24 of the digital camera 10. As explained above, a position where a still image has been transmitted/received can be displayed on the map on the basis of the position information in the history information. For example, a position history display 90A shown in FIG. 20A indicates the number and location of the digital cameras which have transmitted/received a certain still image in Japan. This display example shows that 20 transmissions/receptions have been carried out in Tokyo. If an instruction to select "Tokyo" is issued to the digital camera 10 by the input interface 30 of the digital camera 10, the history information in Tokyo is indicated by a position history detailed display 90B as shown in FIG. 20B. In the position history detailed display 90B, the outline (areas and order of the transmissions/receptions) of the recent transmissions/receptions is indicated by a pop-up display 68C containing a scroll bar in the history of the map information displayed in a magnified form. In the display example shown in FIG. 20B, areas in Tokyo alone are indicated by the pop-up display 68C. However, in the present embodiment, the still image is transmitted/received via the Internet. Therefore, the area specified by the initial selection instruction is rather an initial area indicated by the pop-up display, and, it is natural that areas in other prefectures should then be indicated. In this case, the display proceeds in such a manner as Shinagawa→Osaka→Hachioji→Nagoya. Further, when an area is selected by the input interface 30, the device icons for the transmissions/receptions in that area and details of their history information are displayed as shown in FIG. 20C. This display has been explained in the first and second embodiments of the history display and is therefore not repeatedly explained.

The map information is not limited to Japan, and is applicable to other countries if map information for other countries is used. Moreover, a detailed map specialized in a certain area, for example, a detailed map of Tokyo only can be displayed. In this case, the display is not restricted to city names, and addresses and proper names such as shop names can be displayed at the same time. Further, in the display of the device icons as shown in FIG. 20C, one of the displays as shown in FIGS. 12 to 18 can be executed depending on the display limitation of the display region 24A of the display unit 24 of the digital camera 10.

Figure 21:
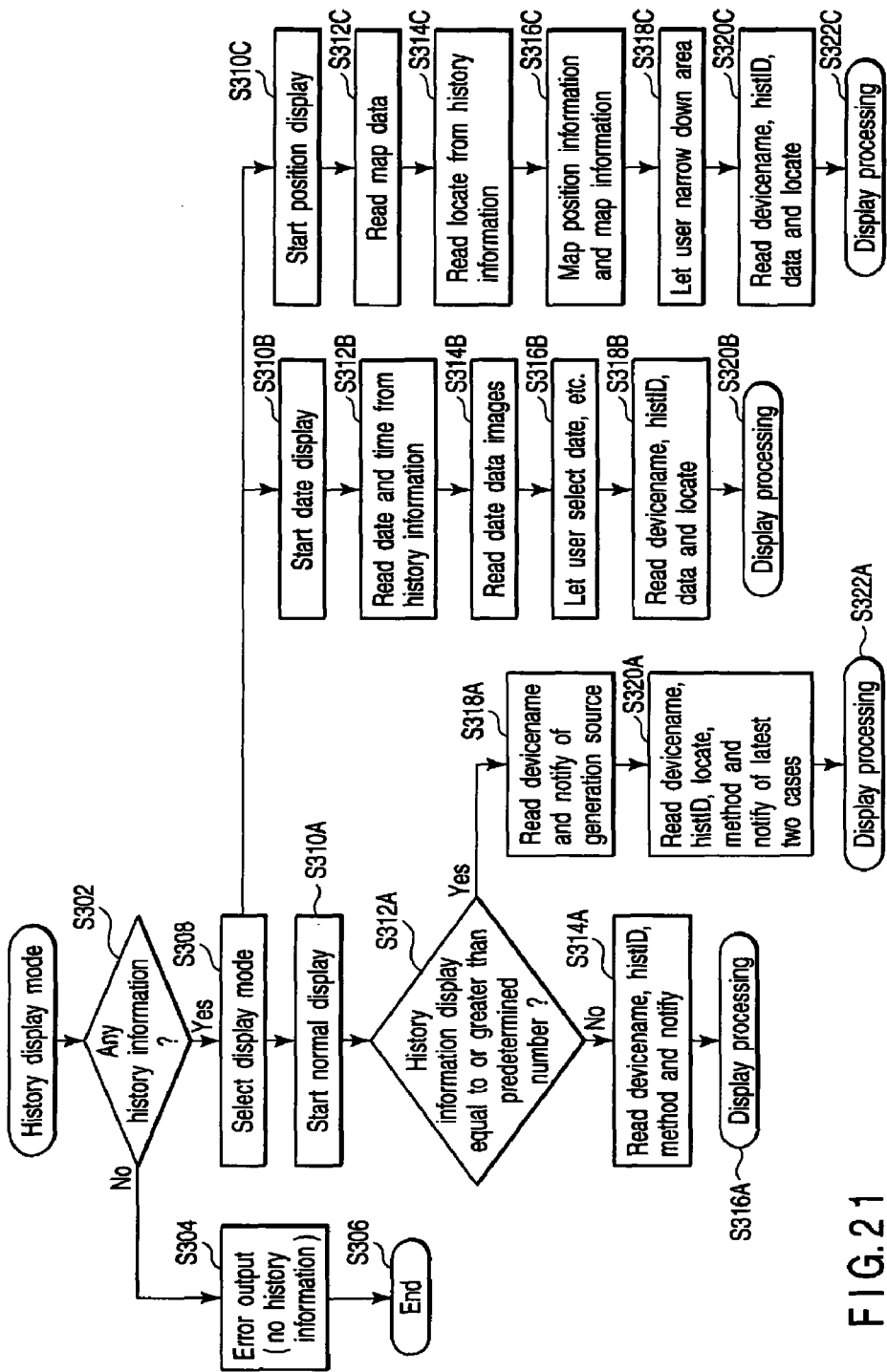
FIG. 21 is a diagram showing a flowchart of display processing when a user of the digital camera can select from a plurality of methods of displaying the history information.

FIG. 21 is a flowchart showing a flow of display processing when the user can select from a plurality of above-mentioned methods of displaying the history information.

When the digital camera 10 is caused to display the history information by the input interface 30, the digital camera 10 starts the flow. First, the digital camera 10 searches to check whether there is history information (step S302). When there is no history information in the history information storage section 20A of the digital camera 10 (step S302 branches to NO), the digital camera 10 provides an error output "no history information" (step S304), and terminates the processing (step S306).

On the other hand, when there is history information (step S302 branches to YES), the user of the digital camera 10 is caused to select a display mode for the history information (step S308). The display modes selectable in step S308 are a normal display (start in step S310A), a date display (start in step S310B) and a position display (start in step S310C).

When the normal display is selected (step S310A), it is judged whether the history information to be displayed is greater than a predetermined number (step S312A). When the history information to be displayed is smaller than the predetermined number (step S312A branches to NO), the device names, IDs, etc., are extracted from the history information (step S314A), and predetermined displays shown as the examples in FIGS. 12 to 15 are executed (step S316A). On the other hand, the history information to be displayed is greater than the predetermined number (step S312A branches to YES), the name of the device which has created the still image and modification information are first extracted (step S318A), and the device names, IDs, etc., for the latest two cases are extracted (step S320A) to execute predetermined displays shown as the examples in FIGS. 16 and 17 (step S322A).

When the date display is selected, date information is extracted from the history information (step S312B). Then, date data images to be displayed as shown in FIGS. 19A to 19D are read (step S314B), and, for example, a date is narrowed down to by the user using these images (step S316B). Finally, the device names, IDs, etc., are extracted (step S318B), and a predetermined display shown as the examples in FIG. 19E is executed (step S320B).

When the position display is selected, the map information is read (step S312C), and the position information in the history information is extracted (step S314C), and then the position information is mapped on the map information (step S316C), thereby allowing the user to narrow down an area (step S318C). The device names, IDs, etc., in the history information corresponding to the position information that has been narrowed down are read (step S320C), and a predetermined display as in FIG. 20C is executed (step S322C).

While the digital camera 10 has been explained above as an example of the information processing device as one embodiment of the present invention, the device to which the present invention is applied is not limited to the digital camera, and the present invention is also applicable to various information processing devices such as a mobile telephone, a DVD recorder, a television, a personal computer or a PDA as well as to a logical device defined by standards such as UPnP and digital living network alliance (DVLA), that is, a digital media server, a digital media player, etc. The transmitted/received content to which the present invention is applied is not limited to still images in the present embodiment, and is various types of content such as moving images, music, sound, text or album content in which the above are combined.

Furthermore, a program of software which achieves the functions of the above-mentioned embodiments can be provided to a computer such that the computer executes this program to achieve the functions.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing device comprising:
a content storage unit which stores content;
a history information processing unit which acquires history information associated with the content, analyzes the history information, and outputs history display information on the basis of the result of the analysis of the history information;
a display unit which displays the history information for the content on the basis of the history display information;
a history information storage section which stores the history information; and
a communication unit which connects to a communication network,
wherein
the history information processing unit has an update section which updates the history information and a history information output section which outputs the updated history information to an external device,
the update section adds, to the history information, at least device identification information for the information processing device, history identification information to identify the number of transmissions/receptions of the content and transmission/reception method information indicating a method of transmitting/receiving the content, and thereby updates the history information, and
the display unit displays a device icon indicating a device specified by the device identification information contained in the history information, a first direction icon which indicates the direction of the transmission/reception of the content among the devices specified by the transmission/reception method information, and a transmission/reception method icon which indicates a content transmitting/receiving method specified by the transmission/reception method information.

2. The information processing device according to claim 1, further comprising:
at least one of a content acquisition unit which acquires arbitrary content from a first device connected to the communication network via the communication unit and stores the content in the content storage unit and a content output unit which outputs arbitrary content stored in the content storage unit of the information processing device to the first device connected to the communication network via the communication unit,
wherein the history information processing unit
acquires the history information concerning the content and stores the updated history information in the history information storage section when the content is acquired from the first device via the communication network in the case where the information processing device is equipped with the content acquisition unit, or
outputs the updated history information concerning the content when the content is output to the first device via the communication network in the case where the information processing device is equipped with the content output unit.

3. The information processing device according to claim 2, wherein
when the information on a change of the content is added to the history information and the history information is thus updated,
the display unit displays the content change icon indicating the information on a change of the content so that this content change icon is disposed on the periphery of the device icon indicating a device which has changed the content.

4. The information processing device according to claim 2, wherein
when the number of transmissions/receptions of the content specified by the history identification information is greater than a predetermined number, the display unit displays at least the device icon indicating a device which is specified by the device identification information and which has generated the content, a device icon indicating a device which updated the device identification information last, and a second direction icon indicating the direction of the transmission/reception of the content in a form different from the first direction icon.

5. The information processing device according to claim 4, further comprising:
an icon selection unit which selects a desired icon from at least one icon displayed on the display unit,
wherein when the second direction icon is selected by the icon selection unit, the display unit displays middle history information on the update of the history information performed between the generation of the content and the last update of the history information, on the basis of the device identification information in the history information.

6. The information processing device according to claim 5, further comprising:
a display size acquisition unit which acquires an available display size of the display unit,
wherein the display unit changes display items of the displayed middle history information in accordance with the available display size acquired by the display size acquisition unit.

7. The information processing device according to claim 2, further comprising:
an icon selection unit which selects a desired icon from at least one icon displayed on the display unit,
wherein when the device icon is selected by the icon selection unit, the display unit displays the updated history information associated with the device indicated by the selected device icon.

8. The information processing device according to claim 2, further comprising:
an icon selection unit which selects a desired icon from at least one icon displayed on the display unit,
wherein when the device icon is selected by the icon selection unit, the display unit displays the selected device icon relatively larger than other device icons.

9. The information processing device according to claim 1, wherein
the update section adds, to the history information, at least one of information on a date when the history information is acquired and/or output, information on the position of the information processing device, and information on a change of the content, and thereby updates the history information.

10. The information processing device according to claim 9, wherein
when the information on a change of the content is added to the history information and the history information is thus updated,
the display unit displays the content change icon indicating the information on a change of the content so that this content change icon is disposed on the periphery of the device icon indicating a device which has changed the content.

11. The information processing device according to claim 9, wherein
when the number of transmissions/receptions of the content specified by the history identification information is greater than a predetermined number, the display unit displays at least the device icon indicating a device which is specified by the device identification information and which has generated the content, a device icon indicating a device which updated the device identification information last, and a second direction icon indicating the direction of the transmission/reception of the content in a form different from the first direction icon.

12. The information processing device according to claim 11, further comprising:
an icon selection unit which selects a desired icon from at least one icon displayed on the display unit,
wherein when the second direction icon is selected by the icon selection unit the display unit displays middle history information on the update of the history information performed between the generation of the content and the last update of the history information, on the basis of the device identification information in the history information.

13. The information processing device according to claim 12, further comprising:
a display size acquisition unit which acquires an available display size of the display unit,
wherein the display unit changes display items of the displayed middle history information in accordance with the available display size acquired by the display size acquisition unit.

14. The information processing device according to claim 9, further comprising:

an icon selection unit which selects a desired icon from at least one icon displayed on the display unit, wherein when the device icon is selected by the icon selection unit, the display unit displays the updated history information associated with the device indicated by the selected device icon.

15. The information processing device according to claim 9, further comprising:

an icon selection unit which selects a desired icon from at least one icon displayed on the display unit, wherein when the device icon is selected by the icon selection unit, the display unit displays the selected device icon relatively larger than other device icons.

16. The information processing device according to claim 1, wherein when the information on a change of the content is added to the history information and the history information is thus updated, the display unit displays the content change icon indicating the information on a change of the content so that this content change icon is disposed on the periphery of the device icon indicating a device which has changed the content.

17. The information processing device according to claim 1, wherein when the number of transmissions/receptions of the content specified by the history identification information is greater than a predetermined number, the display unit displays at least the device icon indicating a device which is specified by the device identification information and which has generated the content, a device icon indicating a device which updated the history information last, and a second direction icon indicating the direction of the transmission/reception of the content in a form different from the first direction icon.

18. The information processing device according to claim 17, further comprising:

an icon selection unit which selects a desired icon from at least one icon displayed on the display unit, wherein when the second direction icon is selected by the icon selection unit, the display unit displays middle history information on the update of the history information performed between the generation of the content and the last update of the history information, on the basis of the device identification information in the history information.

19. The information processing device according to claim 18, further comprising:

a display size acquisition unit which acquires an available display size of the display unit, wherein the display unit changes display items of the displayed middle history information in accordance with the available display size acquired by the display size acquisition unit.

20. The information processing device according to claim 1, further comprising:

an icon selection unit which selects a desired icon from at least one icon displayed on the display unit, wherein when the device icon is selected by the icon selection unit, the display unit displays the updated history information associated with the device indicated by the selected device icon.

21. The information processing device according to claim 1, further comprising:

an icon selection unit which selects a desired icon from at least one icon displayed on the display unit, wherein when the device icon is selected by the icon selection unit, the display unit displays the selected device icon relatively larger than other device icons.

* * * * *